US012738744B2

(12) United States Patent
Kumar et al.

(10) Patent No.: US 12,738,744 B2
(45) Date of Patent: Sep. 15, 2026

(54) RELATING TO THE CONTROL OF POWER CONVERTERS DURING FAULT CONDITIONS IN POWER TRANSMISSION NETWORKS

(71) Applicant: GE Infrastructure Technology LLC, Greenville, SC (US)

(72) Inventors: Amit Kumar, Stafford (GB); Carl Barker, Stafford (GB); Omar Jasim, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 284 days.

(21) Appl. No.: 18/750,568

(22) Filed: Jun. 21, 2024

(65) Prior Publication Data

US 2025/0023357 A1 Jan. 16, 2025

(30) Foreign Application Priority Data

Jul. 11, 2023 (EP) .................................... 23184856

(51) Int. Cl.
*H02J 3/36* (2026.01)
*H02J 3/0012* (2026.01)
*H02J 3/38* (2006.01)
*H02J 101/28* (2026.01)

(52) U.S. Cl.
CPC .............. *H02J 3/36* (2013.01); *H02J 3/0012* (2020.01); *H02J 3/38* (2013.01); *H02J 2101/28* (2026.01)

(58) Field of Classification Search
CPC ........................................................ H02J 3/36
USPC .......................................................... 700/287
See application file for complete search history.

(56) References Cited

U.S. PATENT DOCUMENTS

| | | | | |
|---|---|---|---|---|
| 4,639,848 | A * | 1/1987 | Sakai | H02J 3/36 363/51 |
| 11,962,150 | B1 * | 4/2024 | Bi | H02J 3/381 |
| 12,627,143 | B2 * | 5/2026 | Xu | H02J 3/00125 |
| 2012/0280569 | A1 * | 11/2012 | Alam | H02J 3/32 307/60 |

(Continued)

OTHER PUBLICATIONS

Extended European Search Report issued in EP Application No. 23184856.5 dated Jan. 10, 2024, 9 pages.

(Continued)

*Primary Examiner* — Travis R Hunnings
(74) *Attorney, Agent, or Firm* — Eversheds Sutherland (US) LLP

(57) ABSTRACT

A computer-implemented method of controlling a power converter in a power transmission network, including: measuring a first AC voltage and/or a first AC current at a point of connection, determining whether a fault condition is present in the AC network, setting a current limit for a second AC current output, by: if a fault condition is determined not to be present, setting the current limit to be equal to a first current limit value, and if a fault condition is determined to be present in the AC network, setting the current limit to be equal to a second current limit value, wherein the second current limit value is less than the first current limit value, and regulating, based on the current limit, a second AC voltage that is output from the AC side of the power converter, such that the second AC current does not exceed the current limit.

15 Claims, 15 Drawing Sheets

(56) References Cited

U.S. PATENT DOCUMENTS

| | | | | |
|---|---|---|---|---|
| 2015/0369217 | A1* | 12/2015 | Gupta | H02H 3/006 290/44 |
| 2019/0229673 | A1* | 7/2019 | Liu | H02J 3/466 |
| 2023/0155473 | A1 | 5/2023 | Hernandez Manchola et al. | |
| 2025/0309753 | A1* | 10/2025 | Yi | H02J 3/381 |

OTHER PUBLICATIONS

Shi et al.: Control of Offshore MMC During Asymmetric Offshore AC Faults for Wind Power Transmission. IEEE Journal of Emerging and Selected Topics in Power Electronics, vol. 8, No. 2, pp. 1074-1083, Jun. 2020, doi: 10.1109/JESTPE.2019.2930399.

* cited by examiner

RELATING TO THE CONTROL OF POWER CONVERTERS DURING FAULT CONDITIONS IN POWER TRANSMISSION NETWORKS

TECHNICAL FIELD

The subject matter herein relates generally to the field of power transmission networks and more specifically to the control of power converters during fault conditions in power transmission networks.

BACKGROUND

In high voltage direct current (HVDC) power transmission networks, alternating current (AC) power is typically converted to direct current (DC) power for transmission via overhead lines, under-sea cables and/or underground cables. This conversion removes the need to compensate for the AC reactive/capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks, for instance.

The conversion between DC power and AC power is utilised where it is necessary to interconnect DC and AC networks. In any such power transmission network, power conversion means also known as converters (i.e. power converters in converter stations) are required at each interface between AC and DC power to effect the required conversion from AC to DC or from DC to AC.

The choice of the most suitable HVDC power transmission network or scheme depends on the particular application and scheme features. Examples of power transmission networks include monopole power transmission networks and bipole power transmission networks.

The dynamic exchange of active and reactive power between a power electronic converter interfaced system, such as an HVDC transmission link and the AC power system or grid itself, is primarily governed by a control algorithm employed by the power electronic converter.

SUMMARY

For offshore windfarms, wind turbines are connected to one or more offshore power converters using electrical cables. The offshore power converter/s accept AC power from the wind turbines and convert the AC power to DC power for transmission to one or more onshore power converters. The offshore power converter/s typically operate in a 'grid forming' mode wherein voltage and frequency are controlled. Put differently, the offshore power converter/s typically operate as voltage sourced converters (VSCs).

The electrical cables connecting the wind turbines to the offshore power converters, typically comprise a sheathing that is earthed. During fault conditions (for instance insulation failures), electrical currents flow through the sheathing to earth.

The sheathing itself is specified and designed according to a set of requirements that include the maximum transient current in the event of a cable insulation failure. However, for HVDC schemes in particular, this maximum transient current can often be exceeded. Also, during a fault condition, the offshore windfarms will continue to feed the fault with electrical current. Similarly, the offshore power converter will feed the fault via its own grounding.

Traditionally, to optimize the cost of electrical cables, the ground/earth fault current can be limited by putting a high impedance in the ground/earth electrical path. The high impedance can be achieved through the use of neutral earth reactors/resistors (NERs). When there is a fault to earth/ground, the fault current flows through the impedance provided by the NERs which ultimately reduces the earth/ground current. However, NERs have a high energy rating and are relatively large, requiring additional physical space in deployment. Furthermore, NERs are expensive, and have their own ongoing maintenance requirements. It is therefore desirable to reduce/eliminate the requirement for such equipment, but still maintain the ability to minimize the ground/earth current during a fault.

Power converters are also subject to certain 'ride through' requirements which dictate that a power converter must continue to operate through a fault for a certain period of time. In particular, the power electronics of the power converter itself have intrinsic current limitations that, if exceeded, can affect the operation of, or damage, the power converter. Whilst a power converter could be protected by tripping the scheme during a fault scenario, it is more desirable to allow the system to keep operating whilst monitoring current flow and maintaining the current flow within the rating of the power converter. Put differently, it is desirable to take a controlled action to protect the power converter and the scheme, while it is still operating. The protection of a power converter during a fault can be achieved through certain 'grid forming' control methods/techniques. For instance, in constant AC voltage control, current is only controlled when needed (i.e. during a fault condition) through the use of a current limiting mode. Otherwise, the power converter is controlled as a voltage sourced converter. More specifically, during a fault condition, a current limiting functionality may be implemented in series with the control of the AC voltage of the converter. If a measured current exceeds a particular rating, the voltage demand of the power converter will be dominated by the current limiting functionality. Once a fault has passed, the power converter returns to normal operation (i.e. without current limiting). In practice, such current limiting may last up to a few hundred milliseconds, for instance. Hence, a power converter may be operated temporarily as a current source, with the converter voltage being modulated to reduce current, such that the current flowing through the converter does not exceed a limit value. Such control methods are, however, only for protecting the power converter itself i.e., protecting the power electronics, valves, etc, from damage.

It is desirable to provide a method of controlling a power converter that mitigates these issues.

According to a first aspect of the invention, there is provided a computer-implemented method of controlling a power converter in a power transmission network, the power converter having an AC side electrically connected to an AC network at a point of connection, the method comprising: measuring a first AC voltage and/or a first AC current at the point of connection, thereby providing a measured first AC voltage and/or measured first AC current; determining, based on the measured first AC voltage and/or measured first AC current, whether a fault condition is present in the AC network; setting a current limit for a second AC current output from the AC side of the power converter, by: if a fault condition is determined not to be present in the AC network, setting the current limit to be equal to a first current limit value; and if a fault condition is determined to be present in the AC network, setting the current limit to be equal to a second current limit value, wherein the second current limit value is less than the first current limit value; and regulating, based on the current limit, a second AC voltage that is output from the AC side of the power converter, such that the second AC current does not exceed the current limit.

The inventors have realized that when a fault condition occurs within an AC network (such as a single phase to earth fault), in order to mitigate the power converter feeding the fault, the power converter can be temporarily controlled as a current source by changing the current limiting functionality of the converter. More specifically, when a fault condition is determined, the current limit within the control algorithm for a power converter, can be directly adjusted from a first current limit value (for instance 1 per unit, specified to protect the power converter) to a second, lower, current limit value (for instance 0.5 per unit, specified to minimize ground/earth/fault currents). Hence the voltage demand determined by the control algorithm can be used to adjust the converter output voltage (second AC voltage) to reduce the fault current. This tends to reduce or even eliminate the need for NERs and associated equipment, whilst still minimizing ground/earth currents during a fault, allowing a power converter to 'ride through' the fault. Hence the proposed control algorithm tends to have benefits in respect of a reduction in equipment requirements, cost, and maintenance requirements, owing to the removal of NER equipment. Furthermore, owing to the reduced earth/neutral currents, the need for higher current rated cable sheaths/screens tends to be removed, optimizing cable costs.

The invention as disclosed herein utilizes adaptive current limiting to minimize ground/earth currents during a fault, vice merely using a single fixed current limit specified to protect converter hardware (i.e. converter valves). The current limit is intentionally adjusted, temporarily, for this purpose, whilst allowing a reversion back to the original current limit (and thereby allowing a smooth transition between normal operation and fault conditions). The temporary adjustment of the current limit is desirable in order to minimize disturbances to the operation of a power transmission scheme. For instance, during normal operations a limited current is not generally acceptable, with a power converter being expected to deliver full power up to a maximum ampacity of the power converter (i.e. 1 PU). The invention described herein respects this requirement, by only reducing the current limit when a fault condition is determined/detected, which may for example last a few hundred milliseconds, depending on the measured AC voltage and/or current at the point of connection.

In some embodiments, the measuring the first AC voltage and/or the first AC current, comprises: measuring a first AC phase voltage and/or a first AC phase current, for each electrical phase of the AC network; and calculating a first zero phase sequence component and/or a first negative phase sequence component of the respective first AC phase voltages and/or first AC phase currents.

In a multi-phase, for instance three-phase, system, phase currents and voltages can be represented by symmetrical three single phase components: a positive sequence component; a negative sequence component; and a zero-sequence component. It is the positive sequence component that rotates in phase in accordance with the power system. Hence, in the idealistic scenario, only positive sequence voltage/current will exist. It will be understood that an unbalance in voltage or current between the first, second and third-phases, of a three-phase system, in magnitude or phase angle, can give rise to undesirable negative or zero-sequence components.

Hence a summation of either, the AC phase voltages (the AC phase voltage for each electrical phase), or the AC phase currents (the AC phase currents for each electrical phase), will provide an indication as to whether the AC network is balanced or unbalanced. For the latter, this can be indicative of a fault condition. For instance, a single electrical phase, or even two electrical phases, may have faulted to earth. Thus, the calculation may reveal undesirable negative phase sequence components, or zero phase sequence components, of voltage and/or current, at the electrical point of connection.

In some embodiments, the determining whether the fault condition is present in the AC network, comprises: comparing the first zero phase sequence component and/or first negative phase sequence component to a first threshold and determining whether the fault condition is present by: if the first zero phase sequence component and/or first negative phase sequence component is less than the first threshold, determining the fault condition not to be present in the AC network; if the first zero phase sequence component and/or first negative phase sequence component is greater than or equal to the first threshold, determining the fault condition to be present in the AC network.

During operation of an AC network, a certain amount of deviation of the zero phase sequence component and/or first negative phase sequence component from 'normal' may be expected and tolerated, without being diagnosed as a fault scenario. The first threshold can therefore be set taking this into consideration, such that a fault condition tends to be determined only where operation deviates from normal tolerated values.

In some embodiments, the comparing the first zero phase sequence component and/or first negative phase sequence component to the first threshold comprises: determining, from the first zero phase sequence component and/or first negative phase sequence component, a first percentage of the measured first AC voltage and/or measured first AC current that corresponds to a zero sequence and/or negative sequence voltage component, and/or corresponds to a zero sequence and/or negative sequence current component; and comparing the first percentage to the first threshold.

A certain percentage of zero sequence component of voltage (or equivalently, negative sequence component) and/or current may be accepted as normal for HVDC transmission schemes. If the first zero phase sequence component and/or first negative phase sequence component indicates an increase of zero-sequence or negative sequence component above this percentage (the first threshold), a fault condition may be present in the AC network.

In some embodiments, the first threshold is a second percentage greater than or equal to 1%. More preferably greater than or equal to 1% and less than or equal to 33%. For instance, the second percentage may be greater than or equal to 2% and less than or equal to 10%, or greater than or equal to 2% and less than or equal to 5%.

In certain power transmission schemes, such as HVDC schemes, a certain percentage of zero sequence or negative sequence component of either voltage and/or current may be expected and accepted as normal operation. Hence the second percentage may be 1% (as an example for zero sequence component) or 2% (as an example for negative sequence component) to allow deviations from normal operation to be identified. However, the second percentage may be greater i.e., up to 10%, 33% etc, such that the current limit is only reduced for substantive deviations from normal scheme operation i.e. during major faults, such as single phase to earth faults. The second percentage may be up an intermediate value, such as 5%, in some embodiments to ensure the current limit is reduced for less substantive deviations. The actual selection of the second percentage may be based on the particular power transmission scheme itself, on a case by case basis, taking account of tolerable ground/earth currents, for instance.

Some embodiments, further comprise: redetermining, after the setting of the current limit to be equal to the second current limit value, whether the fault condition is still present in the AC network, and, based on the redetermining: if the redetermining determines that the fault condition is present in the AC network, maintaining the current limit to be equal to the second current limit value; or if the redetermining determines that the fault condition is not present in the AC network, setting the current limit to be equal to the first current limit value.

By redetermining whether the fault condition is still present, after having set the current limit to be equal to the second current limit value, a corresponding action can be taken to either maintain the current limit at the reduced level, or to revert the current limit back to the first current limit value. This ensures that the reduced current limit (the second current limit value) is only used temporarily during fault conditions. Hence the power converter can be reverted back to normal operation smoothly once the fault has cleared.

In some embodiments, the redetermining comprises: remeasuring the first AC phase voltage and/or a first AC phase current, for each electrical phase of the AC network; calculating a second zero phase sequence component and/or second negative phase sequence component of the respective remeasured first AC phase voltages and/or remeasured first AC phase currents; comparing the second zero phase sequence component and/or second negative phase sequence component to a second threshold, and determining whether the fault condition is present by: if the second zero phase sequence component and/or second negative phase sequence component is less than the second threshold, determining the fault condition not to be present in the AC network; if the second zero phase sequence component and/or second negative phase sequence component is greater than or equal to the second threshold, determining the fault condition to be present in the AC network.

The remeasuring of the first AC phase voltages and/or first AC phase currents, and the calculation of the second zero phase sequence component and/or second negative phase sequence component, provides an indication as to whether the AC network is now balanced/approaching balance or is still unbalanced. For instance, the calculation may provide an indication as to whether any zero-sequence component or negative sequence component of either the AC voltage or current, is still present. This may be derived as a percentage of the remeasured first AC voltage and/or AC current. The second threshold may therefore also be a percentage. In some embodiments, this percentage may be greater than or equal to 1% (i.e., for zero sequence) or 2% (i.e., for negative sequence). This percentage may be less than or equal to 33%, or 10%, for instance. This percentage may be greater than or equal to 2% and less than or equal to 5%, for instance. In some embodiments, the second threshold may be the same as the first threshold.

In some embodiments, the AC network is an AC network selected from the list of AC networks consisting of: an AC grid; a renewable power generation network, preferably a wind power generation network; and an electrical load.

The methods described herein allow for adaptation of a current limit used in the control of a power converter, in response to the determination/detection/measurement of a fault condition with an AC network. Such fault conditions are particularly pertinent to AC networks comprising offshore wind farms, where cable insulation faults can occur, and the wind turbines and the power converter would otherwise feed the fault. However, asymmetrical faults are not limited to offshore wind farms or renewable power generation networks. Hence the methods described herein have broader applicability across a number of AC network types, including, for instance, AC grids and various other electrical loads. Put differently, where a power converter is connected to an AC network at a point of connection, the AC voltage and/or AC current can be monitored at the point of connection, and detection of a zero-sequence component/negative-sequence component, can be used as an indication of a fault requiring a current limiting action.

In some embodiments, the fault condition is a fault condition selected from the list of fault conditions consisting of a single-phase to ground fault; a two-phase to ground fault; and another asymmetrical fault.

The methods described herein are particularly relevant to fault conditions corresponding to asymmetrical faults. An asymmetrical fault, such as a single or two-phase to ground fault, can be inferred from monitoring the first AC voltage and/or first AC current at the electrical point of connection. Single-phase to ground faults, and two-phase to ground faults, are specific examples that may arise during operation of a multiphase (for instance a three-phase) AC network. The fault condition itself may, in some embodiments, correspond to a combination of faults.

In some embodiments, the power transmission network is a high voltage direct current (HVDC) power transmission network.

In HVDC power transmission networks, an AC network (such as an offshore windfarm) is connected to a power converter (for instance an offshore power converter) using array cables. The cable screens/sheaths of the array cables are earthed at various locations. When an insulation failure occurs, currents can flow through the screens/sheaths to earth. HVDC schemes can generate high ground fault currents, and hence expensive NERs are often deployed in the ground current path to reduce the ground/earth currents. The methods described herein, when applied to HVDC schemes, can allow for a reduction or elimination of the requirement for NERs. This reduces cost and complexity of the HVDC scheme, whilst also reducing or eliminating the ongoing maintenance requirements associated with NERs or other mitigative equipment.

In some embodiments, the power converter is a voltage sourced converter (VSC), preferably a modular multilevel (MMC) converter.

The methods described herein are particularly relevant to VSCs. This is because VSCs generally operate without current limiting i.e. the power converter is operated as a voltage source and is expected to operate to provide current up to 1 PU. Generally, the only limitation on current that is implemented is to protect the power electronics of the voltage converter itself. The constant AC voltage control algorithm can however be adapted to operate with a reduced current limit i.e. 0.5 PU, upon the detection of a fault condition with an AC network that the power converter is connected to. This allows the power converter to operate as a VSC during normal operation, but to temporarily be current limited during fault conditions.

According to a second aspect of the invention, there is provided a controller for controlling a power converter in a power transmission network, the controller comprising: a memory; and at least one processor; wherein the memory comprises computer-readable instructions which when executed by the at least one processor cause the controller to perform the method of the first aspect of the invention.

According to a third aspect of the invention, there is provided a power converter for a power transmission network, comprising: an AC side for electrically connecting to an AC network at a point of connection; and a DC side for electrically connecting to a DC network; and the controller of the second aspect of the invention.

According to a fourth aspect of the invention, there is provided a power transmission network comprising: an AC network; a DC network; and the power converter of the third aspect of the invention, wherein the AC network is connected to the AC side of the power converter and the DC network is connected to the DC side of the power converter.

According to a fifth aspect of the invention, there is provided a computer program comprising instructions which when executed by a processor of a controller for a power converter, cause the controller to perform the method of the first aspect of the invention.

According to a sixth aspect of the invention, there is provided a non-transitory computer-readable storage medium comprising the computer program of the fifth aspect of the invention.

It will be appreciated that particular features of different aspects of the invention share the technical effects and benefits of corresponding features of other aspects of the invention. More specifically, the controller, power converter, power transmission network, computer program, non-transitory computer-readable medium, share the technical effects and benefits of the computer-implemented method of the invention.

It will also be appreciated that the use of the terms "first" and "second", and the like, are merely intended to help distinguish between similar features and are not intended to indicate a relative importance of one feature over another, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible.

BRIEF DESCRIPTION OF THE DRAWINGS

Embodiments of the invention will now be described by way of example only and with reference to the accompanying drawings, in which.

DETAILED DESCRIPTION

Figure 1:
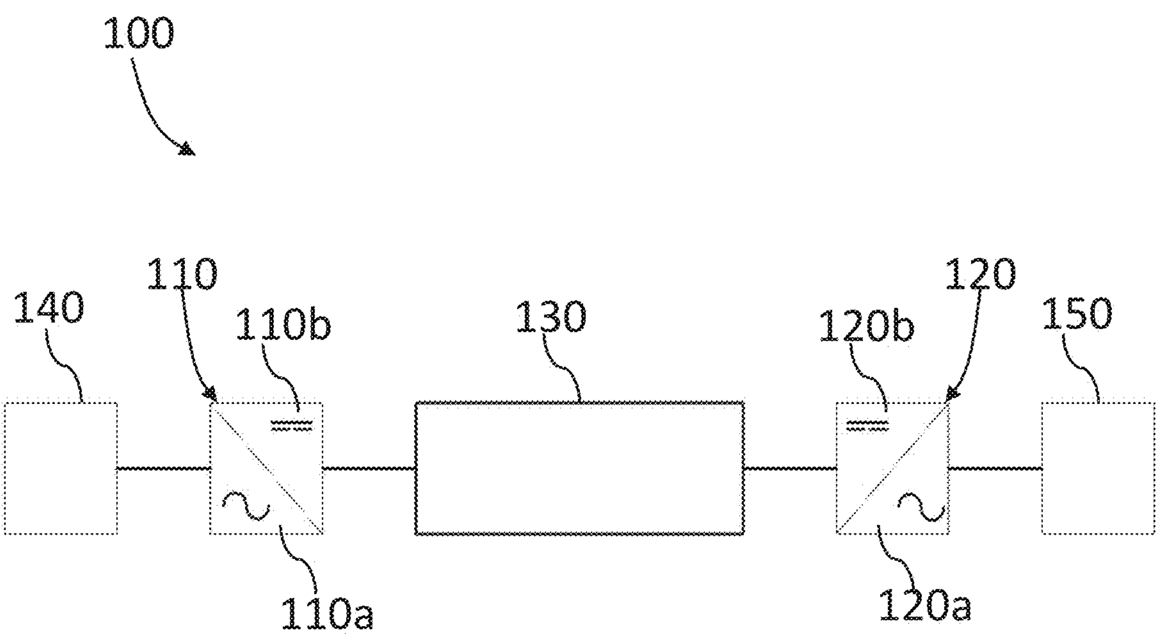
FIG. 1 shows generically, an example of a power transmission network.

FIG. 1 illustrates generically, an example of a power transmission network 100. The illustration is not intended to be limited to representing a particular power transmission scheme, such as a monopole or bipole HVDC transmission network, but is moreover provided as a generic example illustrating principles of operation of a power transmission network that are useful for understanding the invention. In this manner, the power transmission network 100 may represent, generically, a monopole or bipole scheme, or may represent a multiterminal power transmission scheme, for instance. Hence whilst specific features in the illustration are shown connected to each other with a specific number of connections, it will be understood that this is not intended to be limiting either, but moreover to illustrate a generic connection between features/components. Related, is that relative dimensions or distances between components perceived in the illustration are also not intended to be limiting. It will therefore be understood that principles and features in the network 100 and herein discussed can be applied to networks comprising the controller 200 of FIG. 2, for instance. Furthermore, the methods 400 of FIG. 4 and 500 of FIG. 5 may be exercised in a network 100 according to FIG. 1. Furthermore, the controller arrangement 600 of FIG. 6 may be deployed in the network 100 of FIG. 1, and the control logic 700 in FIG. 7*a* and the logic in FIG. 7*b* may be deployed or implemented in the network 100 of FIG. 1.

The power transmission network 100 illustrates a first power conversion means 110 (also known as a converter station) and a second power conversion means 120. The power conversion means 110, 120, convert AC power to DC power (and vice versa), acting essentially as a rectifier (when converting AC power to DC power for transmission) and an inverter (when receiving DC power and converting to AC power). The power conversion means 110, 120, may each comprise a single converter in the case of a monopole system, or two converters in the case of a bipole system. The power conversion means 110, 120, may represent a plurality of converter stations arranged as a multi-terminal power transmission system. Generically, the first power conversion means 110 comprises a first AC side 110*a* and a first DC side 110*b*. Generically, the second power conversion means 120 comprises a second AC side 120*a* and a second DC side 120*b*.

The first power conversion means 110 is illustrated as being connected to a first AC network 140. The first AC network 140 is illustrated as being connected to the first AC side 110*a* of the first power conversion means 110.

The second power conversion means 120 is illustrated as being connected to a second AC network 150. The second AC network 150 is illustrated as being connected to the second AC side 120*a* of the second power conversion means 120. The first AC network 140 and/or second AC network 150 may be electrical power transmission systems comprising power generation apparatus, transmission apparatus, distribution apparatus, and electrical loads. The first AC network 140 and/or second AC network 150 may comprise a renewable power generation network such as a wind-power generation network, solar-power generation network, bio-power generation network. The first AC network 140 or second AC network 150 may be a consumer network. By way of non-limiting example, the first AC network 140 may be a power generation network, with second AC network 150 being a consumer network, for instance.

Also illustrated is a power transmission medium 130 interconnecting the first power conversion means 110 and the second power conversion means 120. The power transmission medium 130 is connected between the first DC side 110*b* of first power conversion means 110 and the second DC side 120*b* of the second power conversion means 120. The power transmission medium 130 may comprise electrical cables and other electrical components interconnecting the first and second power conversion means 110, 120. For instance, the power transmission medium 130 may comprise a conductor providing a first electrical pole; and/or a conductor providing a second electrical pole. A neutral arrangement may also be provided interconnecting the first and second power conversion means 110, 120. The power transmission medium 130 provides the medium through which DC power is transmitted between the power conversion means 120, 130.

The operation of the power transmission system 100 can be generically described as follows. The first AC power generation network 140 generates AC power that is provided to first power conversion means 110 at the first AC side 110*a*. The first power conversion means 110 converts the received AC power to a DC power for transmission to second power conversion means 120. The DC power is transmitted from first DC side 110*b* over the power transmission medium 130 to the second DC side 120*b* of second power conversion means 120. The second power conversion means 120 converts the received DC power back to an AC power. The AC power is then provided from second AC side 120*a* to second AC network 150 for consumption, for instance. In particular examples, the power conversion means 110 and 120 may be geographically remote. For instance, the first power conversion means 110 may reside with an off-shore wind farm and the second power conversion means 120 may reside on-shore.

It will be appreciated that various other electrical components may be located at any particular location or with any particular feature/component in the example 100. These may include switches, transformers, resistors, reactors, surge arrestors, harmonic filters and other components well known in the art.

It will be appreciated that converters or power conversion means may comprise a number of different technologies such as voltage sourced converters (for instance using insulated gate bipolar transistor (IGBT) valves). Such converters may generally be considered to use 'power electronics'. Power electronic converters may comprise multi-level voltage sourced converters, for instance.

It will be appreciated that cables used as power transmission mediums may comprise the following non-limiting examples of crosslinked polyethylene (XLPE) and/or mass impregnated (MI) insulation cables. Such cables may comprise a conductor (such as copper or Aluminium) surrounding by a layer of insulation. Dimensions of cables and their associated layers may be varied according to the specific application (and in particular, operational voltage requirements). Cables may further comprise strengthening or 'armouring' in applications such as subsea installation. Cables may further comprise sheaths/screens that are earthed at one or more locations.

Moreover, it will be understood that the power transmission network 100 may be used with three-phase power systems. In a three-phase power system, three conductors supply respective first, second and third phases of AC power to a consumer. Each of the first, second and third phases will typically have equal magnitude voltages or currents, which are displaced in phase from each other by 120°.

In a three-phase power system, phase currents and voltages can be represented by symmetrical three single phase components: a positive sequence component; a negative sequence component; and a zero-sequence component. It is the positive sequence component that rotates in phase in accordance with the power system. Hence, in the idealistic scenario, only positive sequence voltage/current will exist. It will be understood that an unbalance in voltage or current between the first, second and third-phases, of a three-phase system, in magnitude or phase angle, can give rise to undesirable negative or zero-sequence components and reduction in the positive sequence component. Such an unbalance can be caused by fault conditions, for instance in the AC networks 140, 150.

The power transmission network 100 may be operated using methods such as grid forming wherein either or both of the power converters 110, 120 behave as three-phase, positive-phase sequence AC voltage sources behind an impedance, that control the AC voltage and frequency of the connected AC network 140, 150, to the power transmission network 100.

The power transmission network 100 may further comprise a controller for controlling the operation of components of the power transmission network 100. For instance, a controller may be provided for executing the methods described herein. Such a controller may control the power conversion means 110, 120, for instance. The controller may be the controller 200 of FIG. 2.

Figure 2:
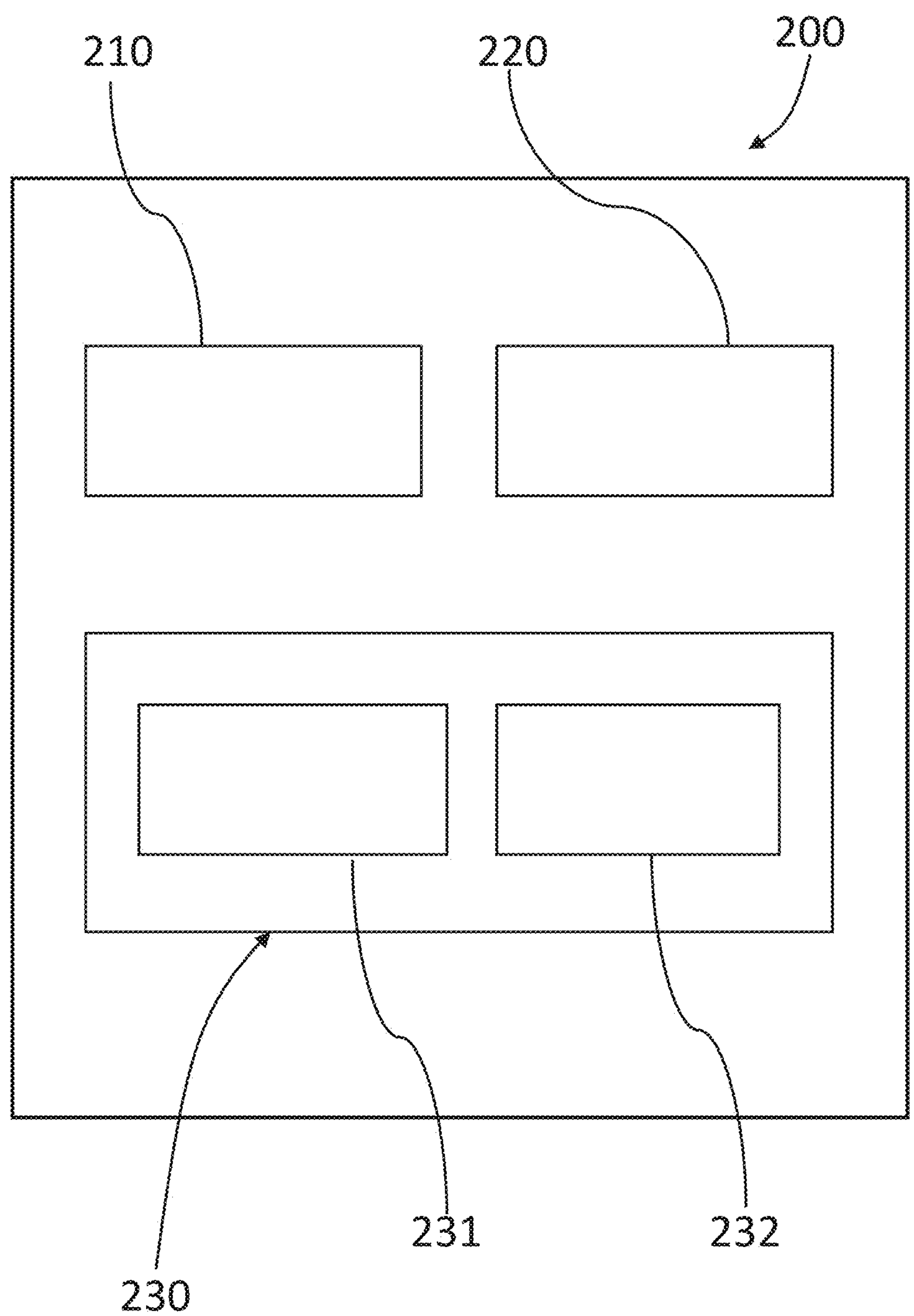
FIG. 2 shows an embodiment of a controller for a power converter.

FIG. 2 illustrates an embodiment of a controller 200 as may be used in implementing the invention described herein.

The controller 200 comprises a memory 210 and at least one processor 220. The memory 210 comprises computer-readable instructions, which when executed by the at least one processor 220, cause the controller 200 to perform the method/s described herein.

The controller 200 is illustrated as comprising a transceiver arrangement 230 which may comprise a separate transmitter 231 and receiver 232. The transceiver arrangement 230 may be used to operatively communicate with other components or features of embodiments described herein either directly or via a further interface such as a network interface. The transceiver arrangement 230 may for instance send and receive control signals using transmitter 231 and receiver 232. The control signals may contain or define electrical control parameters such as reference currents or reference voltages.

The at least one processor 220 is capable of executing computer-readable instructions and/or performing logical operations. The at least one processor 220 may be a microcontroller, microprocessor, central processing unit (CPU), field programmable gate array (FPGA) or similar programmable controller. The controller may further comprise a user input device and/or output device. The processor 220 is communicatively coupled to the memory 210 and may in certain embodiments be coupled to the transceiver 230.

The memory 210 may be a computer readable storage medium. For instance, the memory 210 may include a non-volatile computer storage medium. For example, the memory 210 may include a hard disk drive, flash memory etc.

Whilst not illustrated, the controller 200 may additionally include a user input device interface and/or a user output device interface, which may allow for visual, audible or haptic inputs/outputs. Examples include interfaces to electronic displays, touchscreens, keyboards, mice, speakers and microphones.

Figure 3:
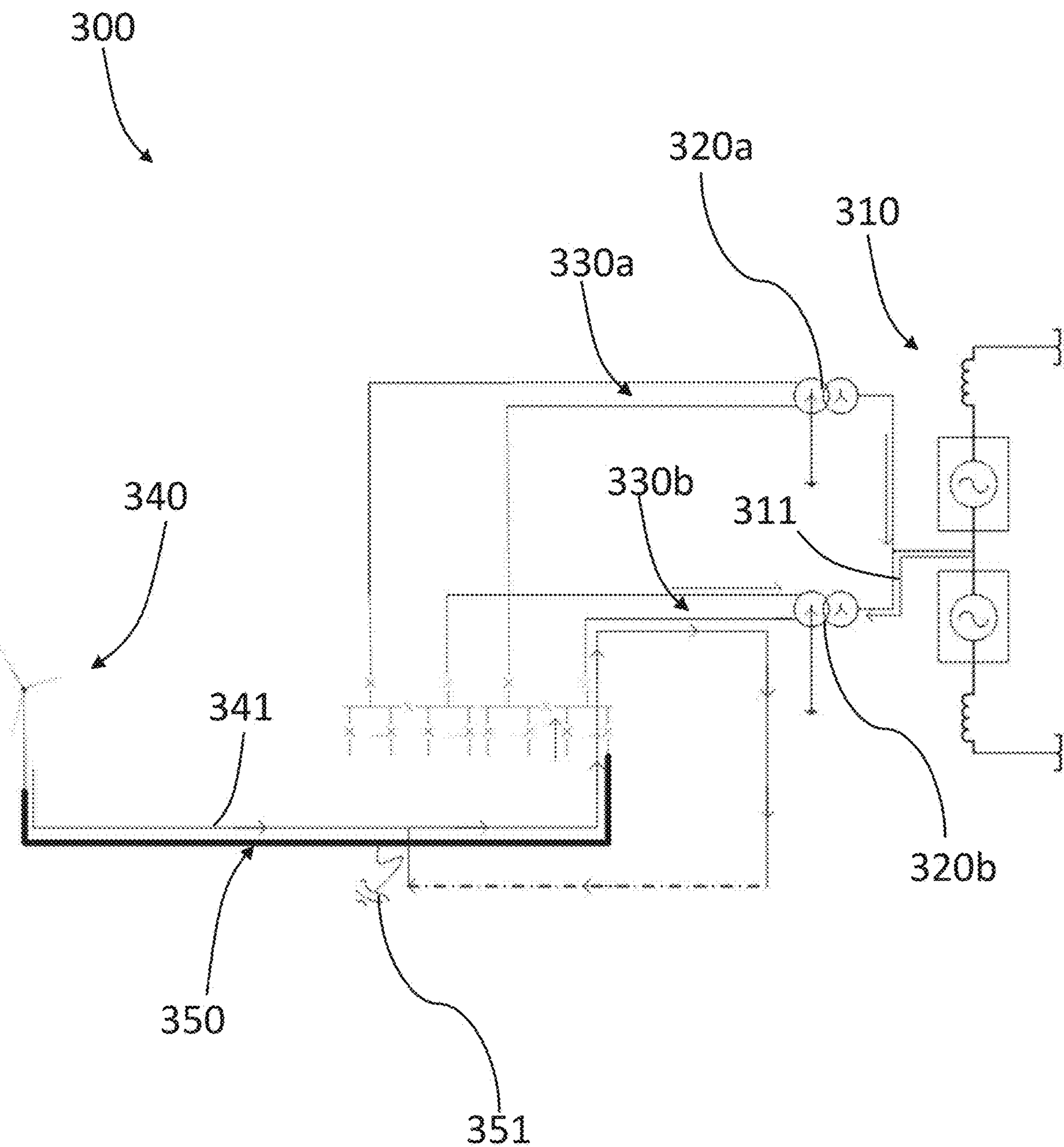
FIG. 3 shows an example, useful for understanding the invention, of a cable insulation fault condition in an offshore symmetrical monopole scheme.

FIG. 3 shows an example, useful for understanding the invention, of a cable insulation fault condition in an offshore symmetrical monopole scheme 300.

The figure shows an offshore power-converter platform 310 connected to two transformers 320*a* and 320*b*. Each transformer, 320*a*, 320*b*, has two respective bus-bars 330*a*, 330*b*. A windfarm 340 feeds AC power to the scheme by providing power via bus-bars 330*a*, 330*b*.

The offshore power-converter platform 310 accepts the AC power and converts the AC power to DC power, thereafter providing the DC power to an onshore converter platform (not shown) via an HVDC power transmission link (not shown).

The offshore power-converter platform 310 controls the AC voltage frequency and magnitude of the connected AC system. This is in accordance with the principle of grid forming. The onshore converter platform will control the DC voltage.

Because the offshore power-converter platform 310 acts as a voltage source, the control of the voltage and frequency is generally performed without controlling electrical current. This is the scenario during 'normal operation'. However, the reality is that fault conditions can occur offshore whereby the power-converter platform 310 could experience electrical currents that are in excess of the maximum current capability of the power converter platform 310. This could cause damage to the power electronics of the power converter platform 310 (for instance the valves). To protect the scheme 300 in such a fault condition, the scheme 300 could merely be tripped by the protection system. However, it is a requirement that the power converter platform 310 be able to 'ride through' such fault conditions to avoid disruption to the operation of the scheme 300. Put differently, the power converter platform 310 must survive a fault condition for a duration of time, which may be a few hundred milliseconds, for instance. Hence the power-converter platform 310 may be configured to limit current flowing through the power converter platform 310 to a maximum, which is typically 1 PU, specified according to the maximum current capability (or AC ampacity) of the power converter platform 310 itself. Put differently, current limiting is generally only used for protecting the power converter itself while meeting fault ride through requirements.

As illustrated in the scheme 300, the windfarm 340 is connected, ultimately, to the power converter platform 310, using array cables 350. These cables 350 have an associated electrical rating. The rating is limited, in part owing to the cables 350 comprising a sheath/screen that has inherent capability limitations. The sheath/screen is earthed at one or more locations 351. Generally, the rating of sheath/screen is defined by the maximum transient current that may flow through the sheath/screen in the event of a cable insulation failure. This rating may, for instance, be 5-7 kA within one second, for instance.

The ground/earth fault currents in cables 350 can exceed their rating during a fault condition. This is particularly the case for HVDC schemes. Furthermore, during a fault condition, the wind farm 340 continues to feed the fault with current, as indicated by arrows 341. The power converter platform 310, having its own grounding, will also effectively feed the fault as indicated by arrows 311. Hence, in addition to protecting the power converter platform 310 during a fault condition, there is also a need to limit the ground/earth fault currents.

Conventionally, the ground/earth faults are limited by including a high impedance in the earth/ground path for the transformers 320*a*, 320*b*. The high impedance components are typically referred to as neutral earth reactors/resistors (NERs). The ground/earth fault currents may then pass through the NERs, reducing the overall current. Other components, such as arrestors and current transformers may also be used.

NERs are however of very high energy and rating. Hence, the NERs require significant space at the platform 310 for deployment. Furthermore, the NERs have a relatively high cost (for the equipment themselves, but also the related costs for the platform 310 i.e. platform size and materials). The deployment of additional components tends to also incur additional design and coordination studies, and introduce further lifetime maintenance considerations (i.e. ongoing costs).

The solution described herein, introduces an additional control feature to directly adjust a power converter (i.e. a VSC) output voltage (i.e. magnitude and phase angle), in response to a fault condition.

This is achieved by changing the current limit functionality within the AC voltage control (i.e. constant AC voltage control) of a power converter, from a first current limit value (for example 1 PU) to a second current limit value (for example 0.5 PU). Constant AC voltage control is a grid forming technique that is utilised to control AC voltage and frequency at the output of an offshore converter, wherein the AC voltage is controlled to a predefined voltage demand and the frequency is controlled for a fundamental value. In case of fault operating conditions, a current limiting functionality is implemented in series with the constant AC voltage control. Once the current exceeds the rated value, the voltage demand of the converter will be dominated by the current limiting functionality as the converter will be controlled as a current source temporarily to modulate the converter voltage to reduce the current (i.e. at the valve winding side) and keep the current within the limit.

As described herein, by monitoring the first AC voltage and/or first AC current at the point of connection, when the sum of the measured instantaneous AC phase voltages and/or AC phase currents is above a first predefined threshold (i.e., the detection of zero sequence voltage and/or current), the total current limit value provided in the current limiting functionality within the constant AC voltage control can be reduced to a second current limit value (for example 0.5 PU, instead of, for instance, a first current limit value equal to 1 PU). Accordingly, the power converter voltage demand determined by the AC voltage control will be used to modulate the converter voltage to reduce the current to e.g. half of its value in the ground/neutral/earth path. This tends to lead to: an elimination or reduction in the need for NERs and associated protection (overcurrent and overvoltage), which is a significant saving in the cost of a power converter platform; and/or a reduction in the need for higher current rating of cable sheaths/screens, which optimise array cable costs.

It is also the case that, once the sum of the measured instantaneous AC phase voltages and/or AC phase currents falls below a second predefined threshold (i.e., fault is cleared), the total current limit value provided in the current limiting functionality can be reversed back to an original first current limit value i.e. 1 PU.

In effect, the change in converter output voltage (second AC voltage) changes the fault current contribution from the converter during a fault condition. In addition, the invention tends to also allow a power converter to ride through a fault condition and smoothly return to normal operation once the fault has cleared.

Figure 4:
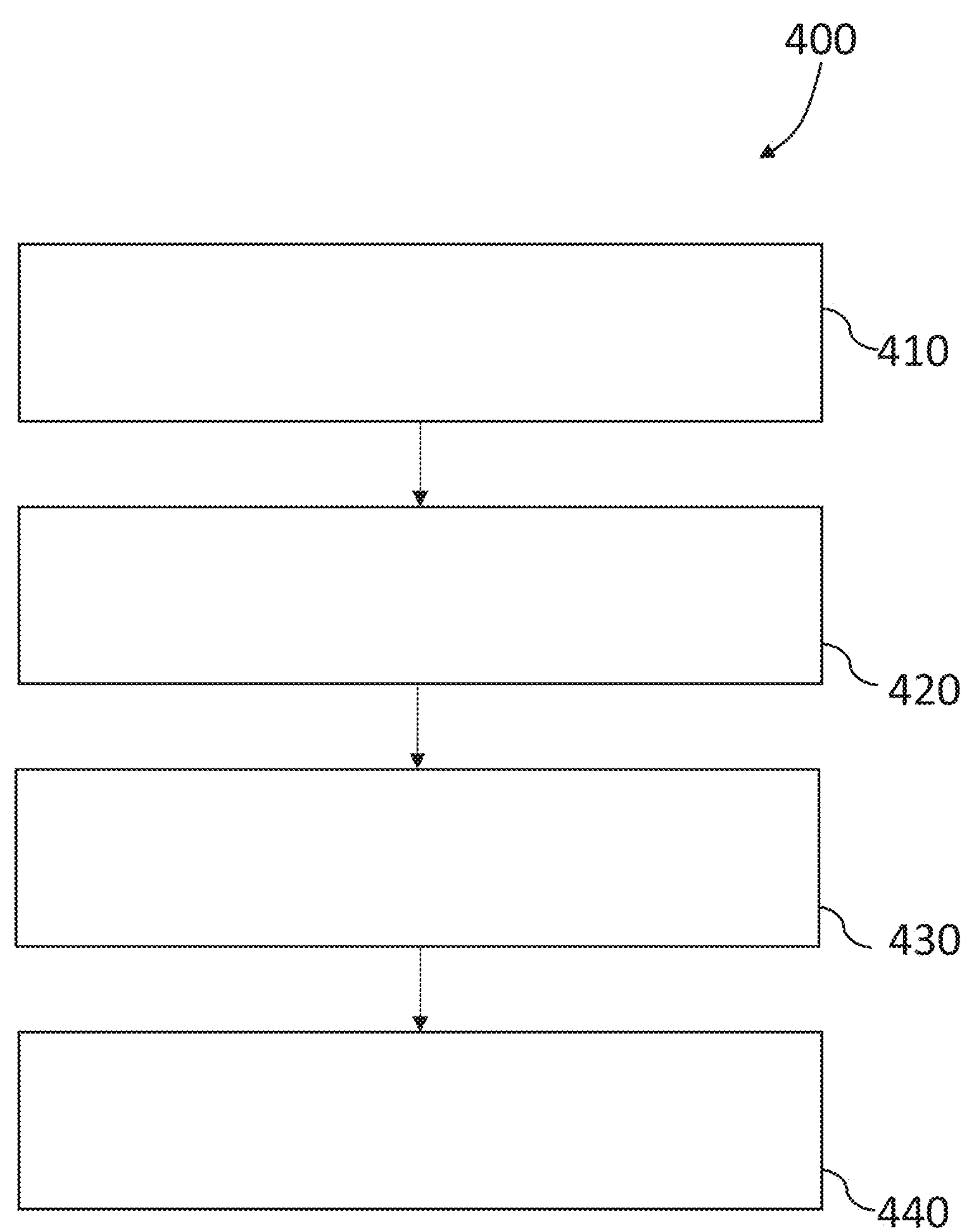
FIG. 4 shows an embodiment of a method of controlling a power converter in a power transmission network.

FIG. 4 shows an embodiment of a method 400 of controlling a power converter in a power transmission network, the power converter having an AC side electrically connected to an AC network at a point of connection.

A first step 410 comprises, measuring a first AC voltage and/or a first AC current at the point of connection, thereby providing a measured first AC voltage and/or measured first AC current.

A further step 420 comprises, determining, based on the measured first AC voltage and/or measured first AC current, whether a fault condition is present in the AC network.

A further step 430 comprises, setting a current limit for a second AC current output from the AC side of the power converter, by: if a fault condition is determined not to be present in the AC network, setting the current limit to be equal to a first current limit value; and if a fault condition is determined to be present in the AC network, setting the current limit to be equal to a second current limit value, wherein the second current limit value is less than the first current limit value.

A further step 440 comprises, regulating, based on the current limit, a second AC voltage that is output from the AC side of the power converter, such that the second AC current does not exceed the current limit.

Figure 5:
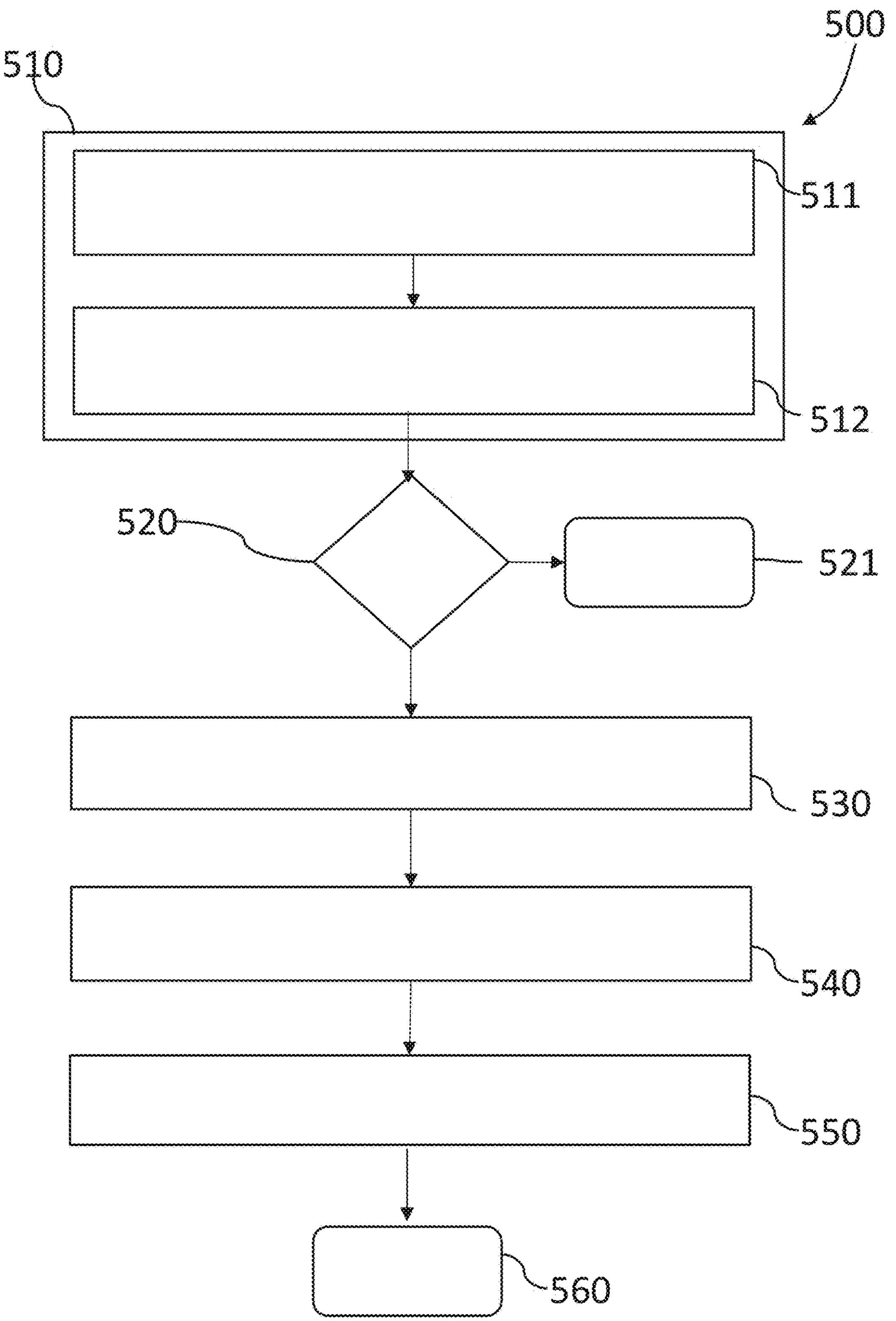
FIG. 5 shows a further embodiment of a method of controlling a power converter in a power transmission network.

FIG. 5 shows a further embodiment of a method 500 of controlling a power converter in a power transmission network, the power converter having an AC side electrically connected to an AC network at a point of connection. The power converter being generally controlled as a voltage source behind an impedance.

A first step 510 comprises, measuring a first AC voltage and/or a first AC current at the point of connection, thereby providing a measured first AC voltage and/or measured first AC current. The first step 510 comprises measuring 511 a first AC phase voltage and/or a first AC phase current, for each electrical phase of the AC network (i.e. measuring the AC voltage/current instantaneous values); and calculating 512 a summation of the respective first AC phase voltages and/or first AC phase currents (i.e. calculating the sum of three phase values to obtain a zero sequence component).

A further step 520 comprises, determining, based on the measured first AC voltage and/or measured first AC current, whether a fault condition is present in the AC network. The further step 520 comprises comparing the summation (i.e., the zero sequence component) to a first threshold and determining whether the fault condition is present by: if the summation is less than the first threshold, determining the fault condition not to be present in the AC network; if the summation is greater than or equal to the first threshold, determining the fault condition to be present in the AC network. If the fault condition is not present, the procedure ends 521 (in effect, the current limit remains at the first current limit value). If the fault condition is present, the procedure continues to step 530.

A further step 530 comprises, setting a current limit for a second AC current output from the AC side of the power converter. Note that a fault condition has already been determined to be present in the AC network in step 520. In this step 530, the current limit is set to be equal to a second current limit value, wherein the second current limit value is less than the first current limit value (i.e. the step involves reducing the current limit value to the second current limit value).

A further step 540 comprises, regulating, based on the current limit, a second AC voltage that is output from the AC side of the power converter, such that the second AC current does not exceed the current limit. The step 540 comprises changing the reference voltage for the valves in the power converter, the reference voltage being determined by the constant AC voltage control of the power converter and the current limiting functionality.

At step 550, as a result of the preceding method steps, the ground fault current is reduced.

At step 560, the method 500 ends.

Figure 6:
FIG. 6 shows an example arrangement of a controller in a power transmission network.
Figure 6:
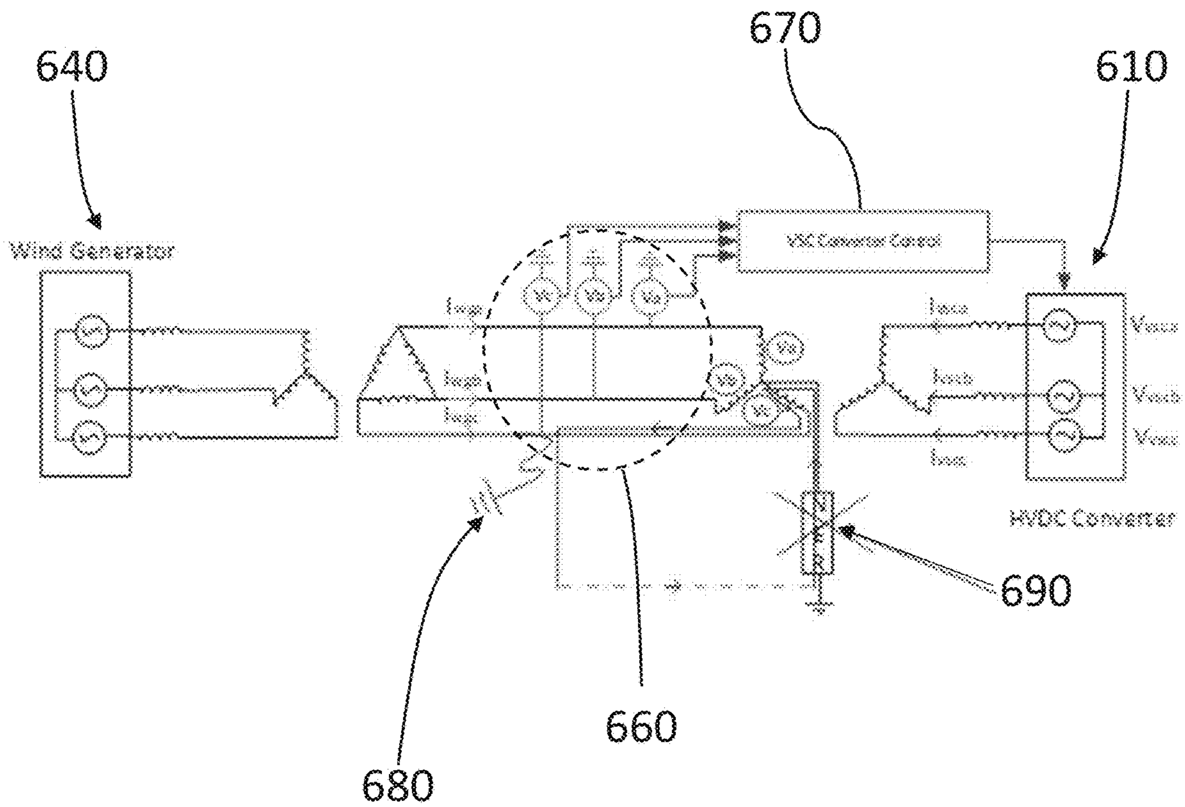

FIG. 6 shows an example arrangement 600 of a controller for controlling a power converter in a power transmission network.

The arrangement 600 shows an HVDC power converter 610 connected to a wind power generator 640. The wind power generator 640 feeds three-phase power.

At a point of connection 660, the first AC phase voltages are illustrated as Va, Vb and Vc. The wind power generator 640 is illustrated as feeding respective currents Iwga, Iwgb, Iwgc.

The power converter 610 is illustrated as providing second AC phase voltages of Vvsca, Vvscb, Vvscc, for each electrical phase, respectively. The related electrical currents are illustrated as Ivsca, Ivscb, Ivscc, respectively.

As shown in the arrangement 600, a VSC converter controller 670 is connected at the point of connection 660. The VSC converter controller 670 is further connected to the HVDC converter 610. The VSC converter controller 670 operates in accordance with the methods described herein. More specifically the VSC converter controller 670 measures the first AC phase voltages Va, Vb, Vc at the point of connection 660. The VSC converter controller 670 drives the converter 610 as a voltage source during normal operation. If after calculating the sum of the first AC phase voltages Va, Vb, Vc, it is determined that a fault condition exists, the converter controller 670 reduces the current limit of the converter 610.

As shown in the arrangement 600, during a ground/earth fault 680, the method described herein allows the controller 670 to regulate/limit the current Ivsca, Ivscb, Ivscc, the converter 610 feeds to the fault. Hence the NER 690 can be removed from the arrangement 600. The control logic will now be described in greater detail.

FIG. **7*a* shows an embodiment 700** of control logic, for controlling a power converter in a power transmission network.

A reference voltage 701 for the point of common coupling (i.e. the electrical point of connection 660 in FIG. 6) is illustrated as 'Vpcc_ref'. A measured voltage 702 at the point of common coupling (i.e. the first AC voltage, as referred to herein) is illustrated as 'Vpcc_meas'. The reference voltage 701 and the measured voltage 702 are combined at a first summing junction 703. More specifically, the measured voltage 702 is subtracted from the reference voltage 701. This feeds a first controller 704.

The first controller 704 receives the difference and outputs an electrical current reference error 705, designated 'ΔIref'. This is fed into a second summing junction 706 wherein the electrical current reference error 705 is added to a measured current 707 measured as the point of common coupling. The measured current 707 is illustrated as 'Ipcc_meas' in the figure.

Output from the second summing junction 706 is a total current 708, illustrated as 'Itot'. This total current 708 feeds into a current limiter 709.

During normal operation, the current limiter 709 is configured to not limit current that is below 1 PU. Put differently, the current limiter 709 sets a current limit based on the AC ampacity/current limitations of the power converter. Hence, provided the total current 708 is less than a current that would damage the power converter, the current will not be limited. The output of the current limiter 709, is a determined current value 711, illustrated as 'Idem'. This is either the total current 708 or a limited current dictated by the limit value 710 provided to the current limiter 709 (which as described, is typically 1 PU for normal operation).

The determined current value 711 is fed to a third summing junction 712, wherein the measured current 707 is subtracted from the determined current value 711. Hence, the output from the third summing junction 712 is an error value 713, referred to as 'Ierr'. During normal operation wherein the current limiter 709 is not limiting current, the error value 713 will be equal to the reference value 705.

The error value 713 is provided to a second controller 714. The second controller 714 uses the error value 713 to generate a regulated voltage value 715 for controlling a power converter that will satisfy the required condition of the measured current 707 following a reference (i.e. the electrical current reference error 705 will be driven to zero).

At a fourth summing junction 716, the regulated voltage value 715 is added to an impedance compensation 717 that factors in the measured current 707 passing through the impedance of the power converter. The resultant converter voltage demand signal 718, referred to as 'Vconv_demand', is then provided to the power converter power electronics.

As shown in the figure, additional control logic is also implemented. Specifically, the measured voltage 702 at the point of connection is also provided to a zero-sequence detection block 719. If the zero-sequence detection block 719 determines that a fault condition is present (for instance, by determining that a zero sequence component exceeds a first threshold value), then the current limit 710 for the current limiter 709 is set to a second current limit value 720*a* of 0.5 PU. Alternatively, if the zero-sequence detection block 719 determines that a fault condition is not present, then the current limit 710 for the current limiter 709 is set to a first current limit value 720*b* of 1 PU.

Hence, during an operational scenario where a fault condition is present, a zero sequence may be detected at zero sequence detection block 719. The limit value 710 is changed to be that of 720*a* i.e. 0.5 PU. If the total current 708 entering current limiter 709 exceeds 0.5 PU, then the determined current 711 output from limiter 709 will be 0.5 PU. Hence the current error 713 output from the summing junction 712 will not be equal to the reference 705—it will instead now be based additionally on the current limit 710. Hence the demand signal 718 provided to the power converter will be determined by the current limiting functionality of the control logic 700 i.e. the power converter will be operated effectively as a current source.

Upon removal of the fault condition, the control logic 700 will result in the limit value 710 being reset back to 1 PU i.e. the first current limit value 720*b*. Hence the power converter will again be controlled as a voltage source.

Figure 7A:
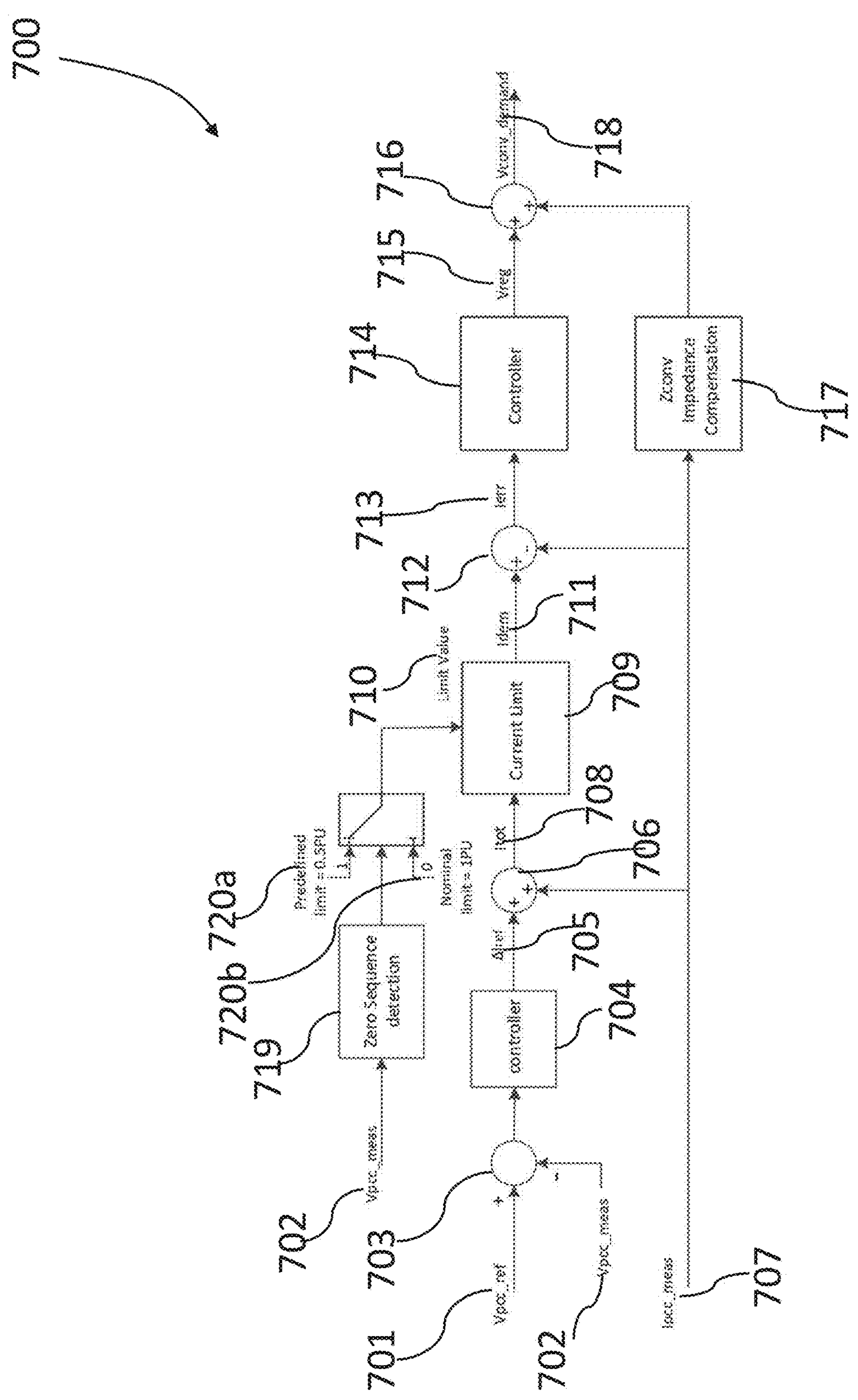
FIG. 7*a* shows an embodiment of control logic in a power transmission network.
Figure 7B:
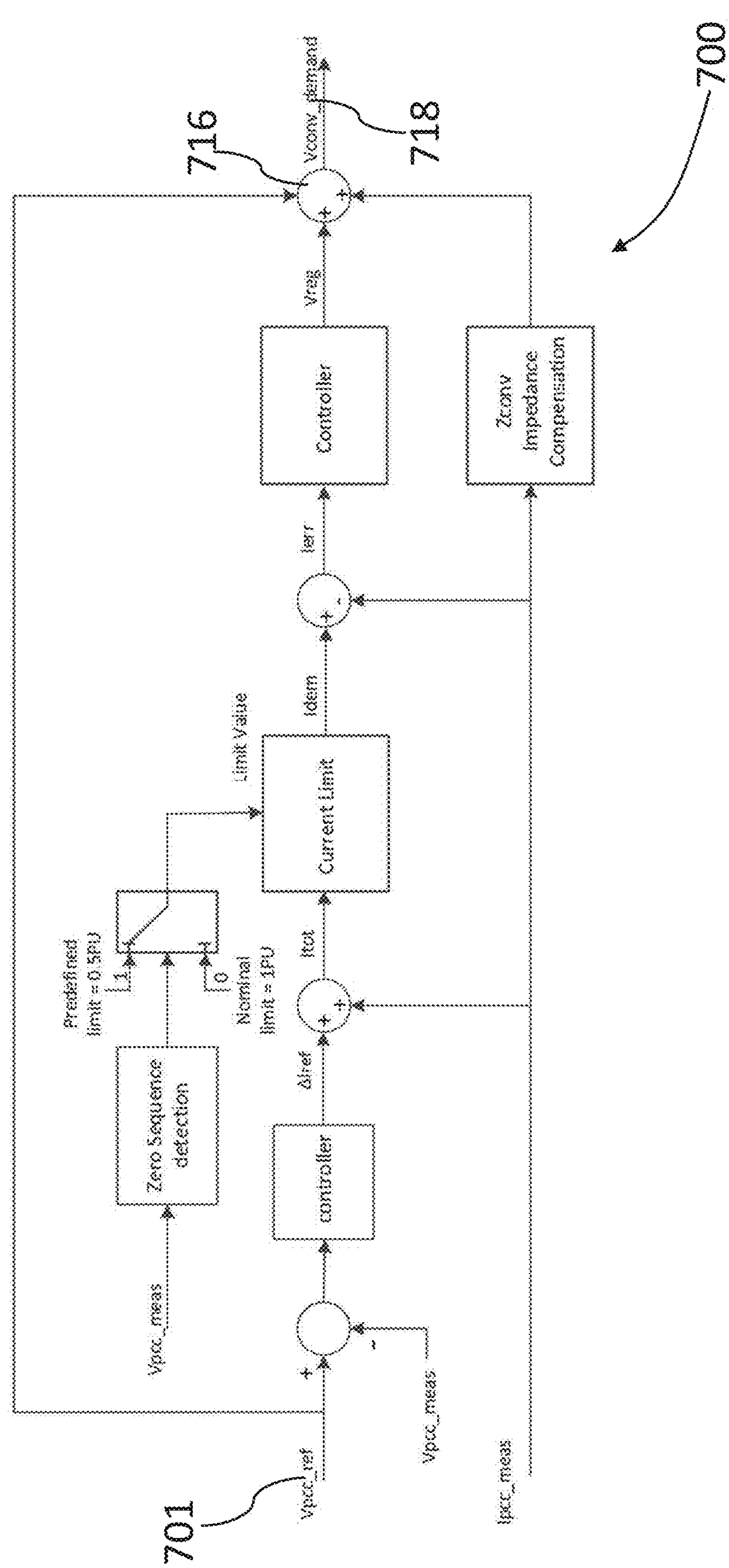
FIG. 7*b* shows an augmentation to the embodiment of FIG. 7*a;*

FIG. 7*b* shows the embodiment 700 of control logic of FIG. 7*a*, augmented with a feedforward for AC voltage control. The description provided herein for FIG. 7*a* applies to FIG. 7*b*, unless otherwise stated. Specifically, in FIG. 7*b*, the fourth summing junction 716 also receives the reference voltage 701 as a feedforward for calculating the converter voltage demand 718.

FIGS. 8A-8F show example signals during a single phase to ground fault condition with a 1 PU current limit implemented, for instance, as the current limit 710 in the limiter 709 of FIG. 7*a* or 7*b*.

Figure 8A:
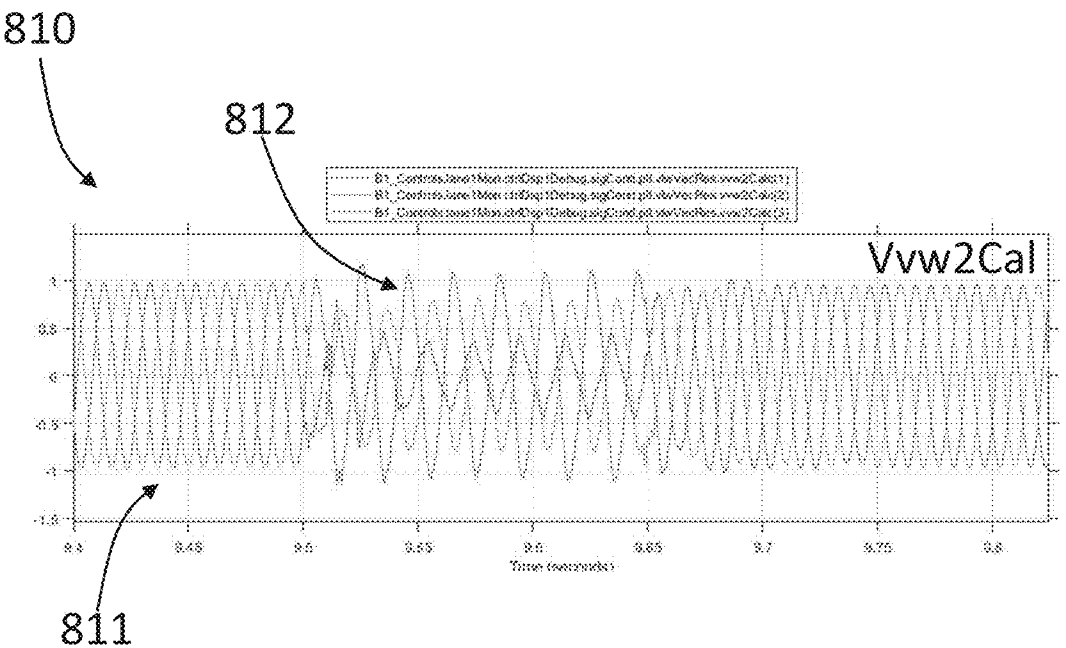
FIGS. 8A-8F show example signals during a single phase to ground fault condition with a 1 PU current limit.

FIG. 8A shows measured three phase valve winding voltage (of transformer 320*a* in FIG. 3) signals 810, referred to as 'Vvw2Cal', before 811 and during 812, the fault condition.

Figure 8B:
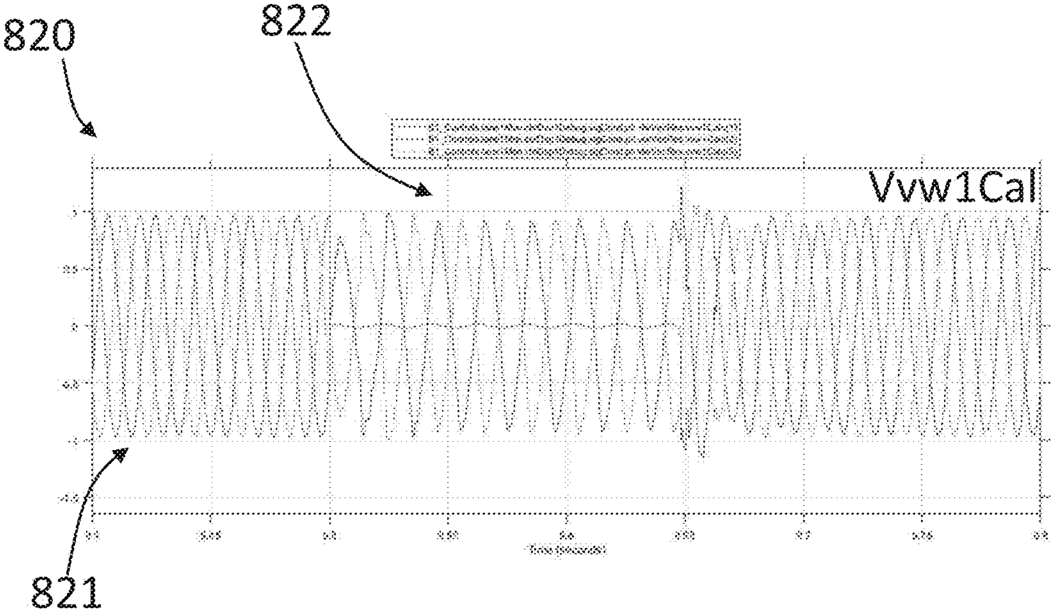

FIG. 8B shows measured three phase valve winding voltage (of transformer 320*b* in FIG. 3) signals 820, referred to as 'Vvw1Cal', before 821 and during 822, the fault condition.

Figure 8C:
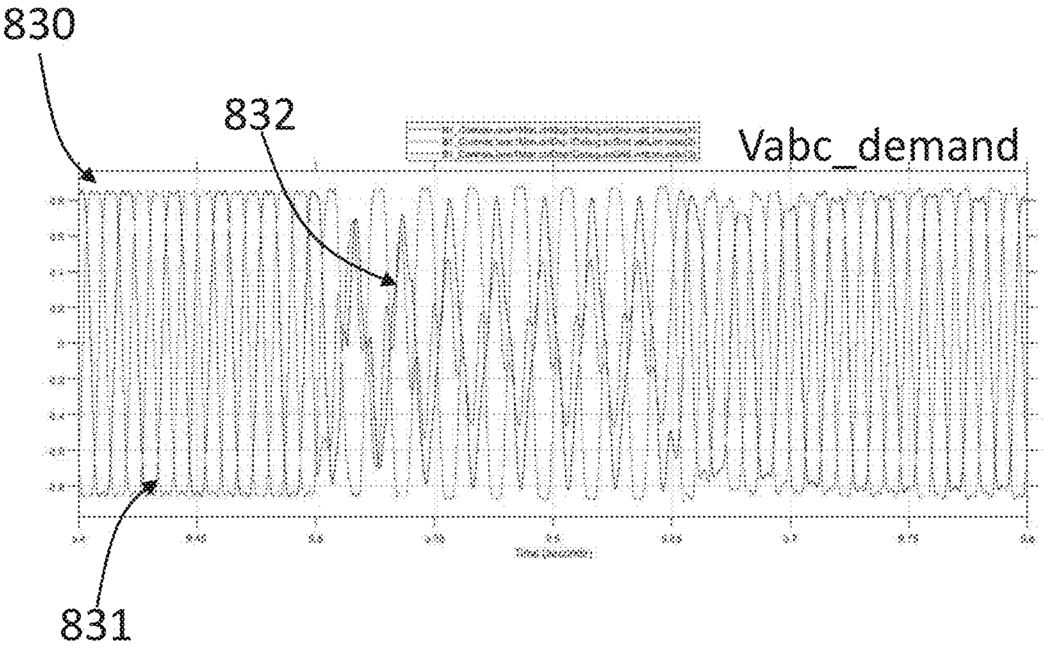

FIG. 8C shows power converter three phase reference voltage demand (i.e., 718 of FIG. 7*a*) signals 830, referred to as 'Vabc_demand', before 831 and during 832, the fault condition.

Figure 8D:
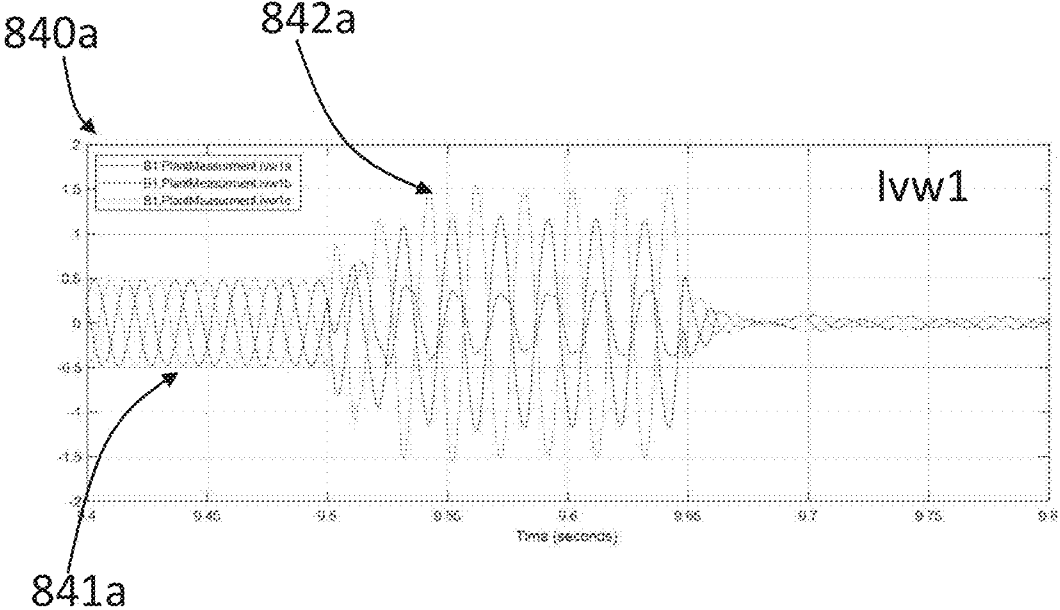

FIG. 8D shows measured three phase valve winding current (i.e., of transformer 320*b* in FIG. 3) signals 840*a*, referred to as 'Ivw1', before 841*a* and during 842*a*, the fault condition.

Figure 8E:
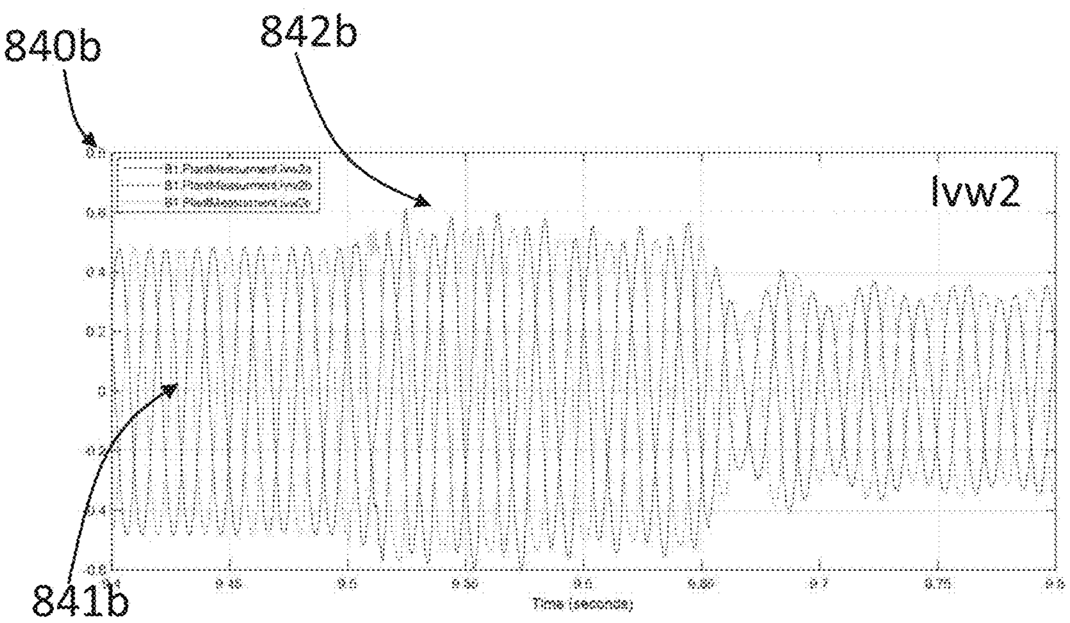

FIG. 8E shows measured three phase valve winding current (of transformer 320*a* in FIG. 3) signals 840*b* referred to as 'Ivw2', before 841*b* and during 842*b*, the fault condition.

Figure 8F:
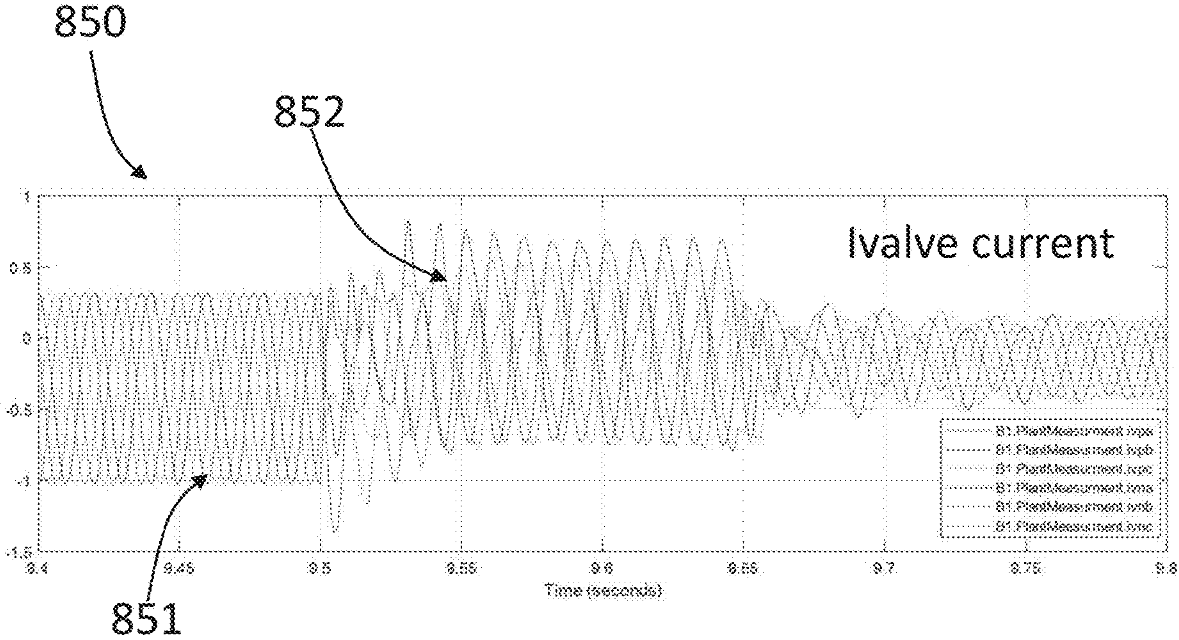

FIG. 8F shows measured three phase valve current (of power converter 310 in FIG. 3) signals 850, referred to as 'Ivalve current', before 851 and during 852, the fault condition.

FIGS. 9A-9F show example signals measured during a single phase to ground fault with a 0.5 PU current limit introduced during the fault condition.

Figure 9A:
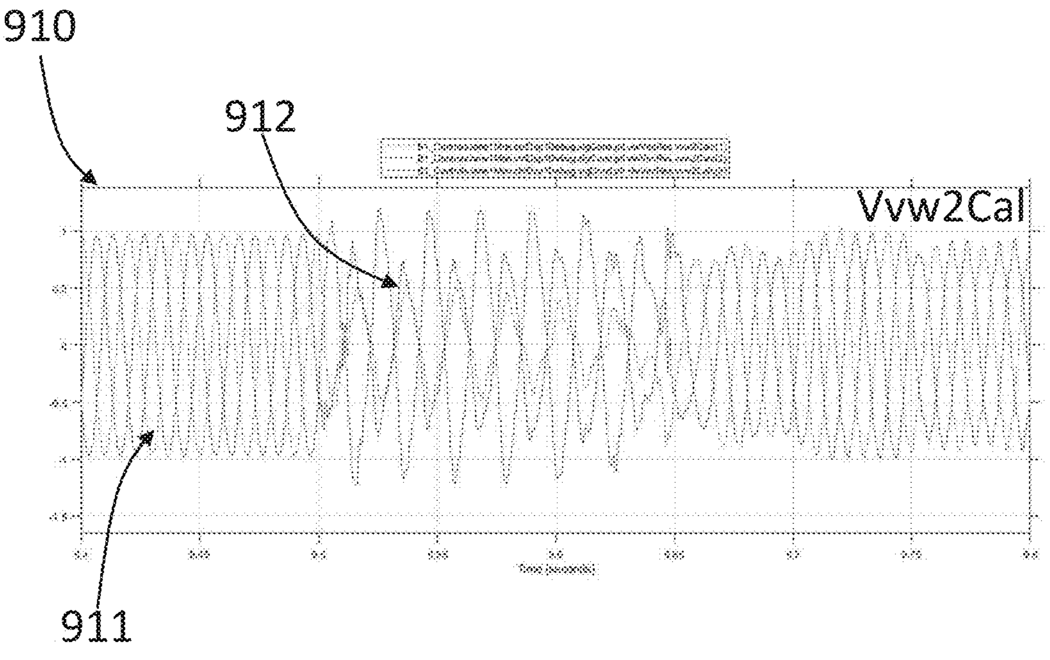
FIGS. 9A-9F show example signals measured during a single phase to ground fault with a 0.5 PU current limit introduced during the fault condition.

FIG. 9A shows measured three phase valve winding voltage (of transformer 320*a* in FIG. 3) signals 910, referred to as 'Vvw2Cal', before 911 and during 912, the fault condition.

Figure 9B:
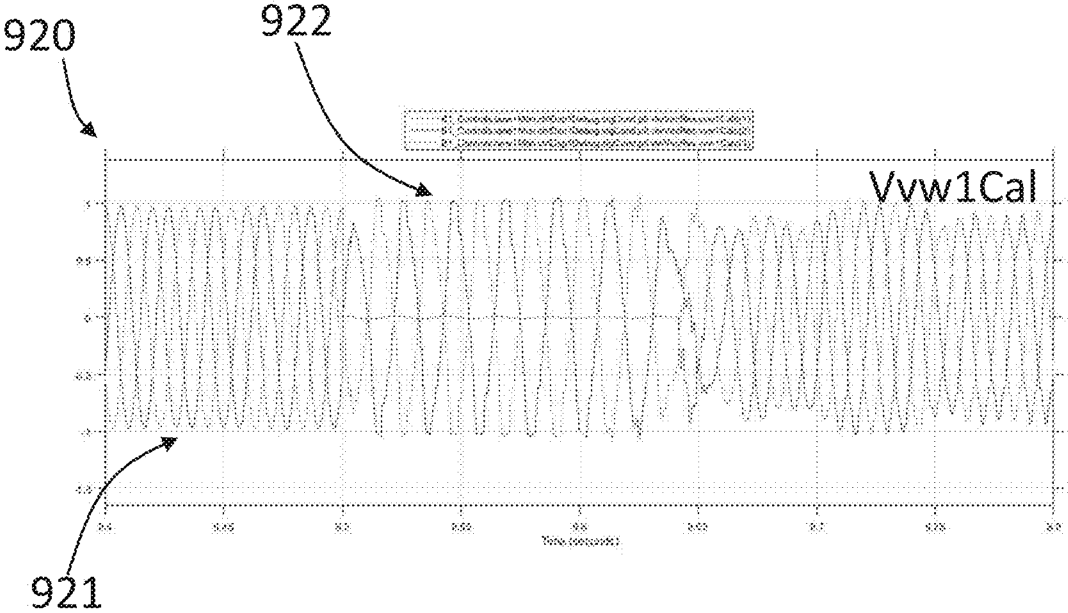

FIG. 9B shows measured three phase valve winding voltage (of transformer 320*b* in FIG. 3) signals 920, referred to as 'Vvw1Cal', before 921 and during 922, the fault condition.

Figure 9C:
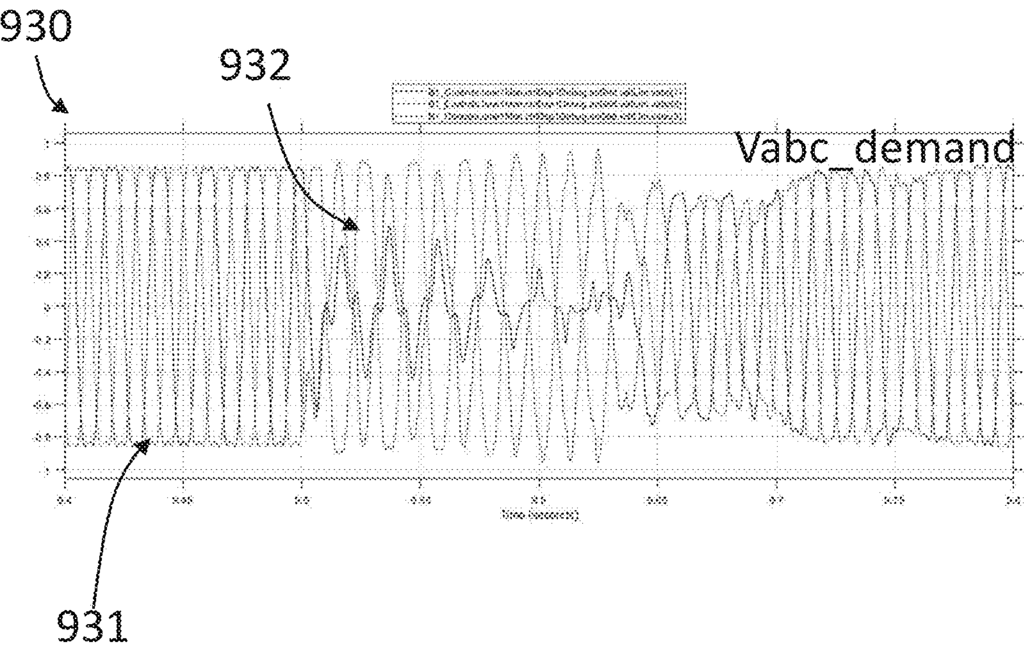

FIG. 9C shows power converter three phase reference voltage demand (i.e., 718 in FIG. 7*a*) signals 930, referred to as 'Vabc_demand', before 931 and during 932, the fault condition.

Figure 9D:
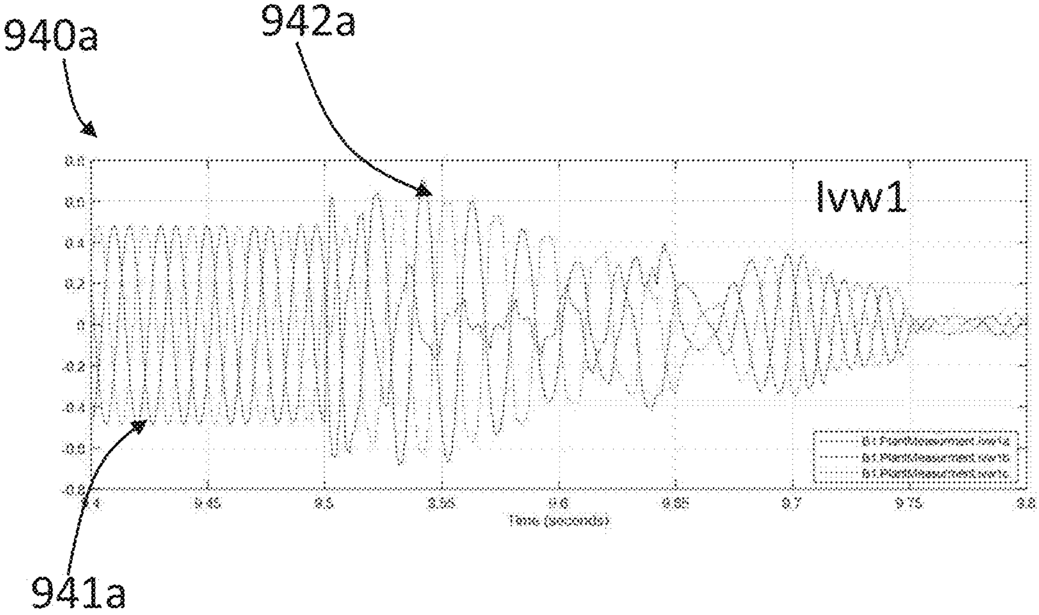

FIG. 9D shows measured three phase valve winding current (of transformer 320*b* in FIG. 3) signals 940*a*, referred to as 'Ivw1', before 941*a* and during 942*a*, the fault condition.

Figure 9E:
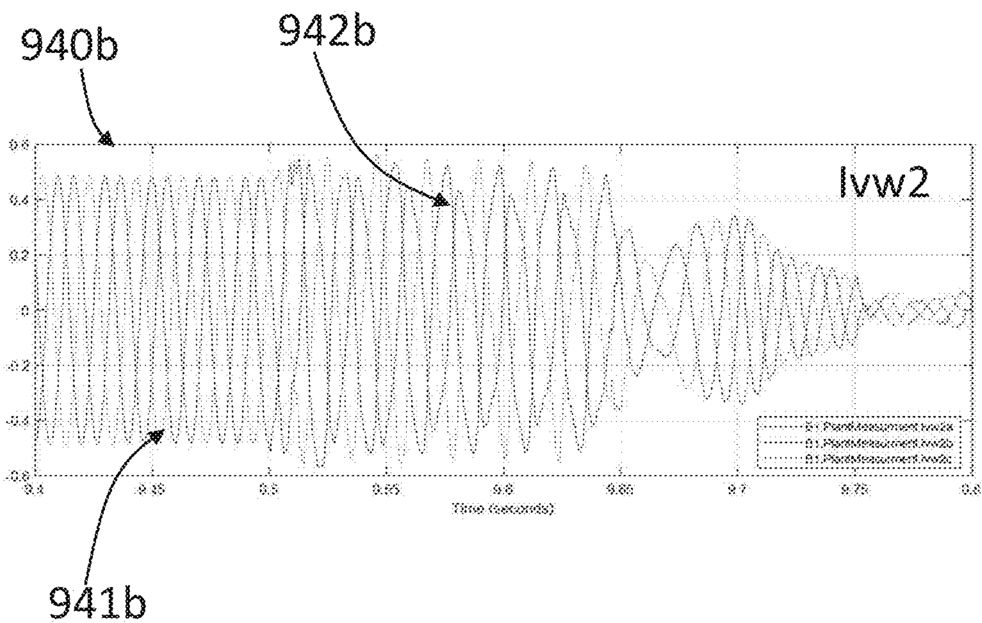

FIG. 9E shows measured three phase valve winding current (of transformer 320*a* in FIG. 3) signals 940*b*, referred to as 'Ivw2', before 941*b* and during 942*b* the fault condition.

Figure 9F:
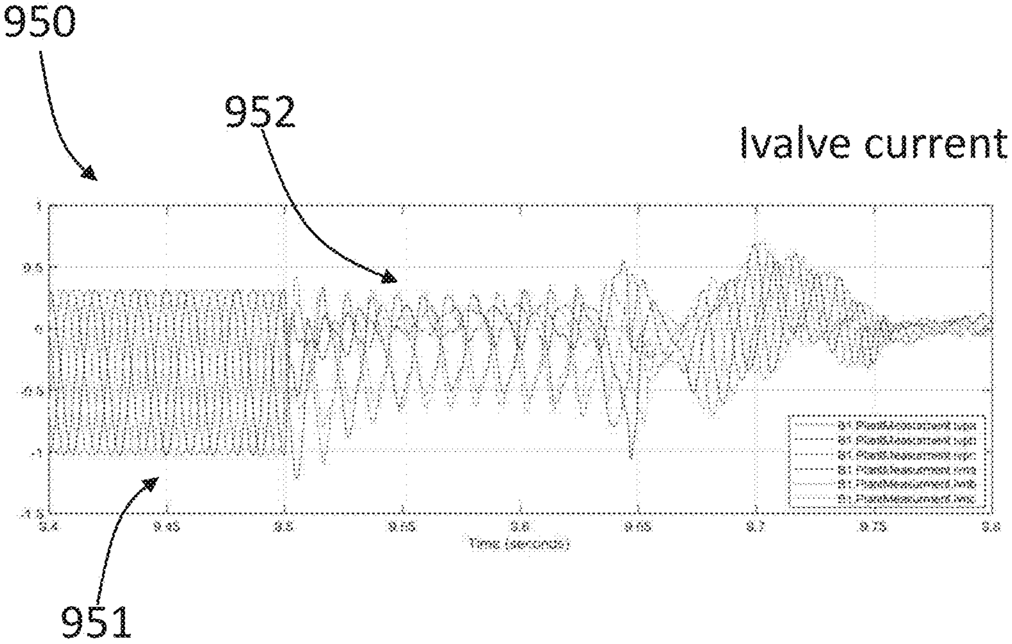

FIG. 9F shows measured three phase valve current (of power converter 310 in FIG. 3) signals 950, referred to as 'Ivalve current', before 951 and during 952, the fault condition.

Figure 10:
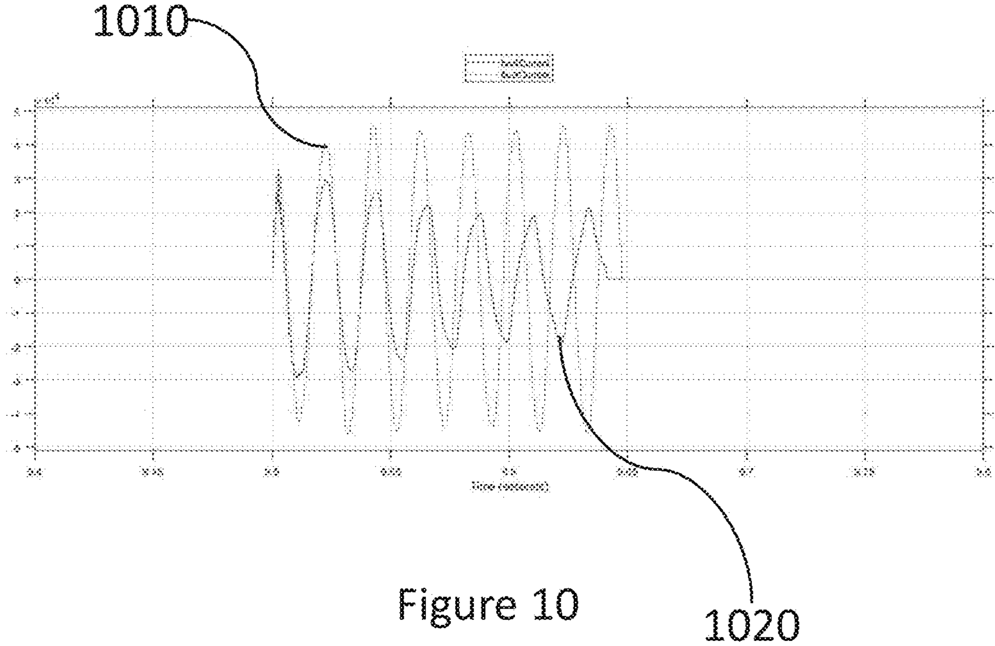
FIG. 10 shows example fault currents during a fault condition.

FIG. 10 shows the fault current 1010 during the fault condition for the scenario illustrated in FIGS. 8A-8F, and the fault current 1020 during the fault condition for the scenario illustrated in FIGS. 9A-9F. As shown in the figure, introducing a reduced current limit in the converter control has led to a reduced fault current 1020 in comparison with the fault current 1010. More specifically, the fault current has approximately halved from having an amplitude of 4.5 to having an amplitude of 2.

Whilst the embodiments described herein may indicate specific values for the first current limit value, such as 1 PU, these are not intended to be limiting. Other values may be chosen or used depending on the application. For instance 1.1 PU, 1.2 PU, 0.9 PU, 0.8 PU.

Whilst the embodiments described herein may indicate specific values for the second current limit value, such as 0.5 PU, these are not intended to be limiting. For instance 0.9 PU, 0.8 PU, 0.75 PU, 0.5 PU, 0.25 PU etc, could be used, provided the value is less than first current limit value.

Specific fault ride through profiles are determined according to the application requirements, but may last a few hundred milliseconds, for instance up to 150 ms, or may even last up to 1.25 second, for instance.

Whilst specific embodiments are described in relation to windfarms and offshore converter stations, the invention described herein can more generally be applied to, for instance, AC grids, or other loads.

Whilst specific embodiments described herein may refer to measuring three-phase voltages at the point of connection, alternatively the three-phase currents could be measured and used to ascertain whether a fault condition has arisen in the AC network.

Whilst specific fault conditions may be used to illustrate the invention, any fault condition, or combination of fault conditions, giving rise to a zero sequence at the point of connection can be envisaged as being a fault condition for which the invention described can be applied.

The invention described herein tends to have the advantage of providing an algorithm-based solution (i.e. a soft solution) that can be implemented in new or existing hardware, for controlling a power converter.

Reference throughout this specification to an example of a particular method or apparatus, or similar language, means that a particular feature, structure, or characteristic described in connection with that example is included in at least one implementation of the method and apparatus described herein. The terms “including”, “comprising”, “having”, and variations thereof, mean “including but not limited to”, unless expressly specified otherwise. An enumerated listing of items does not imply that any or all of the items are mutually exclusive, unless expressly specified otherwise. The terms “a”, “an”, and “the” also refer to “one or more”, unless expressly specified otherwise.

As used herein, a list with a conjunction of “and/of” includes any single item in the list or a combination of items in the list. For example, a list of A, B and/or C includes only A, only B, only C, a combination of A and B, a combination of B and C, a combination of A and C or a combination of A, B and C. As used herein, a list using the terminology “one or more of” includes any single item in the list or a combination of items in the list. For example, one or more of A, B and C includes only A, only B, only C, a combination of A and B, a combination of B and C, a combination of A and C or a combination of A, B and C. As used herein, a list using the terminology “one of” includes one, and only one, of any single item in the list. For example, “one of A, B and C” includes only A, only B or only C and excludes combinations of A, B and C. As used herein, “a member selected from the group consisting of A, B, and C” includes one and only one of A, B, or C, and excludes combinations of A, B, and C.” As used herein, “a member selected from the group consisting of A, B, and C and combinations thereof” includes only A, only B, only C, a combination of A and B, a combination of B and C, a combination of A and C or a combination of A, B and C.

Aspects of the disclosed method and apparatus are described with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The schematic flowchart diagrams and/or schematic block diagrams in the Figures illustrate the architecture, functionality, and operation of possible implementations of apparatuses, systems, methods, and program products. In this regard, each block in the schematic flowchart diagrams and/or schematic block diagrams may represent a module, segment, or portion of code, which includes one or more executable instructions of the code for implementing the specified logical function(s).

It will be appreciated that numerical values recited herein are merely intended to help illustrate the working of the invention and may vary depending on the requirements of a given power transmission network, component thereof, or power transmission application.

The listing or discussion of apparently prior-published documents or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The disclosure herein also provides a VSC HVDC scheme, comprising at least one VSC converter. The converter (s) being connected to pole (s) and operable to control a converter output voltage (magnitude and angle). Wherein the converter scheme includes a supplementary controller programmed to adjust the converter output voltage by controlling temporarily the converter in a current limiting mode, by using a predefined value (or a value set by some function i.e., a function of a determined condition such as amount of zero sequence or negative sequence component) of a current limit (i.e., a second limit value) within the AC voltage control to be less than a first current limit value (i.e., 1 PU) when the measured instantaneous phase voltage of AC bus is above the first threshold (i.e. detection of zero sequence voltage) and remove the adjusted current limit value to its nominal value i.e. 1 PU once the sum of measured value instantaneous phase voltage of AC bus below a second threshold. The instantaneous change in converter voltage tend to change the fault current contribution from the converter, hence reducing the ground current in case of ground faults. The controller tends to be programmed to change directly the converter reference voltage as a function of the measured AC bus voltage and/or current.

We claim:

1. A computer-implemented method of controlling a power converter in a power transmission network, the power converter having an alternating current 'AC' side electrically connected to an AC network at a point of connection, the method comprising:
measuring a first AC voltage and/or a first AC current at the point of connection, thereby providing a measured first AC voltage and/or measured first AC current;
determining, based on the measured first AC voltage and/or measured first AC current, whether a fault condition is present in the AC network;
setting a current limit for a second AC current output from the AC side of the power converter, by:
if a fault condition is determined not to be present in the AC network, setting the current limit to be equal to a first current limit value; and
if a fault condition is determined to be present in the AC network, setting the current limit to be equal to a second current limit value, wherein the second current limit value is less than the first current limit value; and
regulating, based on the current limit, a second AC voltage that is output from the AC side of the power converter, such that the second AC current does not exceed the current limit.

2. The computer-implemented method of claim 1, wherein the measuring the first AC voltage and/or the first AC current, comprises:
measuring a first AC phase voltage and/or a first AC phase current, for each electrical phase of the AC network; and
calculating a first zero phase sequence component and/or a first negative phase sequence component of the respective first AC phase voltages and/or first AC phase currents.

3. The computer implemented method of claim 2, wherein the determining whether the fault condition is present in the AC network, comprises:
comparing the calculated first zero phase sequence component and/or first negative phase sequence component to a first threshold and determining whether the fault condition is present by:
if the calculated first zero phase sequence component and/or first negative phase sequence component is less than the first threshold, determining the fault condition not to be present in the AC network;
if the calculated first zero phase sequence component and/or first negative phase sequence component is greater than or equal to the first threshold, determining the fault condition to be present in the AC network.

4. The computer-implemented method of claim 3, wherein the comparing the calculated first zero phase sequence component and/or first negative phase sequence component to the first threshold comprises:
determining, from the calculated first zero phase sequence component and/or first negative phase sequence component, a first percentage of the measured first AC voltage and/or measured first AC current that corresponds to a zero sequence and/or negative sequence voltage component and/or that corresponds to a zero sequence and/or negative sequence current component; and
comparing the first percentage to the first threshold.

5. The computer-implemented method of claim 4, wherein the first threshold is a second percentage greater than or equal to 1%, more preferably greater than or equal to 1% and less than or equal to 33%.

6. The computer-implemented method of claim 3, further comprising:
redetermining, after the setting of the current limit to be equal to the second current limit value, whether the fault condition is still present in the AC network, and, based on the redetermining:
if the redetermining determines that the fault condition is present in the AC network, maintaining the current limit to be equal to the second current limit value; or
if the redetermining determines that the fault condition is not present in the AC network, setting the current limit to be equal to the first current limit value.

7. The computer-implemented method of claim 6, wherein the redetermining comprises:
remeasuring the first AC phase voltage and/or a first AC phase current, for each electrical phase of the AC network;
calculating a second zero phase sequence component and/or second negative phase sequence component of the respective remeasured first AC phase voltages and/or remeasured first AC phase currents;
comparing the second zero phase sequence component and/or second negative phase sequence component to a second threshold and determining whether the fault condition is present by:
if the second zero phase sequence component and/or second negative phase sequence component is less than the second threshold, determining the fault condition not to be present in the AC network;
if the second zero phase sequence component and/or second negative phase sequence component is greater than or equal to the second threshold, determining the fault condition to be present in the AC network.

8. The computer-implemented method of claim 1, wherein the AC network is an AC network selected from the list of AC networks consisting of:
an AC grid;
a renewable power generation network, preferably a wind power generation network; and
an electrical load.

9. The computer-implemented method of claim 1, wherein the fault condition is a fault condition selected from the list of fault conditions consisting of:
a single-phase to ground fault;
a two-phase to ground fault; and
another asymmetrical fault.

10. The computer-implemented method of claim 1, wherein the power transmission network is a high voltage direct current 'HVDC' power transmission network.

11. The computer-implemented method of claim 1, wherein the power converter is a voltage sourced converter 'VSC', preferably a modular multilevel 'MMC' converter.

12. A controller for controlling a power converter in a power transmission network, the controller comprising:
a memory; and
at least one processor;
wherein the memory comprises computer-readable instructions which when executed by the at least one processor cause the controller to perform the method claim 1.

13. A power converter for a power transmission network, comprising:

an AC side for electrically connecting to an AC network at a point of connection; and a DC side for electrically connecting to a DC network; and the controller of claim 12.

14. A power transmission network comprising:

an AC network;

a DC network; and the power converter of claim 13, wherein the AC network is connected to the AC side of the power converter and the DC network is connected to the DC side of the power converter.

15. A computer program comprising instructions which when executed by a processor of a controller for a power converter, cause the controller to perform the method of claim 1.

* * * * *